(12) United States Patent
De Jongh et al.

(10) Patent No.: US 11,394,408 B2
(45) Date of Patent: Jul. 19, 2022

(54) ANTENNA TUNING AND RESONANCE ADJUSTMENT SYSTEM AND METHOD

(71) Applicant: QUALCOMM INCORPORATED, San Diego, CA (US)

(72) Inventors: Maurice Adrianus De Jongh, Nijmegen (NL); Anton Arriagada, San Marcos, CA (US); Juseok Bae, San Diego, CA (US); Daniel Filipovic, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/161,352

(22) Filed: Jan. 28, 2021

(65) Prior Publication Data

US 2021/0234561 A1 Jul. 29, 2021

Related U.S. Application Data

(60) Provisional application No. 62/967,291, filed on Jan. 29, 2020.

(51) Int. Cl.
*H04B 1/00* (2006.01)
*H04B 1/44* (2006.01)
*H04B 1/401* (2015.01)

(52) U.S. Cl.
CPC .......... *H04B 1/0064* (2013.01); *H04B 1/401* (2013.01); *H04B 1/44* (2013.01)

(58) Field of Classification Search
CPC ......... H04B 1/0064; H04B 1/401; H04B 1/44
See application file for complete search history.

(56) References Cited

U.S. PATENT DOCUMENTS

| | | |
|---|---|---|
| 8,903,333 B1 | 12/2014 | Khlat |
| 2012/0146865 A1* | 6/2012 | Hayashi .................. H01Q 9/42 343/750 |
| 2013/0005278 A1 | 1/2013 | Black et al. |
| 2014/0340181 A1* | 11/2014 | Bakalski ................. H03J 5/244 334/55 |
| 2017/0040973 A1* | 2/2017 | Ranta .................. H01L 27/1203 |
| 2017/0063413 A1* | 3/2017 | Ripley ................ H04B 1/0458 |
| 2021/0242859 A1* | 8/2021 | Nagano .................... H01Q 1/50 |

OTHER PUBLICATIONS

International Search Report and Written Opinion—PCT/US2021/015600—ISA/EPO—dated May 18, 2021.

* cited by examiner

*Primary Examiner* — Nguyen T Vo
(74) *Attorney, Agent, or Firm* — Smith Tempel Blaha LLC/Qualcomm

(57) ABSTRACT

An antenna tuner includes a control core, a switch logic coupled to the control core, the switch logic comprising a variable off-capacitance, and an electrical coupling coupled to the switch logic, the electrical coupling configured to connect the switch logic to an antenna system.

30 Claims, 28 Drawing Sheets

| Band | Name | Downlink [MHz] | Uplink [MHz] |
|---|---|---|---|
| 28 | LB700 | 758– 803 | 703– 748 |
| 5 | LB850 | 869– 894 | 824– 849 |
| 1 | MB2100 | 2110– 2170 | 1920– 1980 |
| 7 | HB2600 | 2620– 2690 | 2500– 2570 |

*FIG. 5*

| Case | # CA bands | Band | Band Name | Tuner State | Resonance Mover State |
|---|---|---|---|---|---|
| A | 2 | 28 & 1 | LB700 + MB2100 | N | 1 (or 1" as alternative)) |
| B | 2 | 28 & 7 | LB700 + HB2600 | N | 1' (or 1" as alternative) |
| C | 2 | 5 & 1 | LB850 + MB2100 | N+1 | 0 |
| D | 2 | 5 & 7 | LB850 + HB2600 | N+1 | 0 |
| E | 2 | 1 & 7 | MB2100 + HB2600 | N+1 | 0 |
| E' | 2 | 1 & 7 | MB2100 + HB2600 | N | 1" |
| F | 3 | 5 & 1 & 7 | LB850 + MB2100 + HB2600 | N+1 | 0 |
| G | 3 | 28 & 1 & 7 | LB700 + MB2100 + HB2600 | N | 1" |

*FIG. 9*

| Case | # CA bands | Band combo | Band names | Tuner State | Resonance Mover state |
|---|---|---|---|---|---|
| A | 2 | 28 & 1 | LB700 + MB2100 | N | 1 + 2 (or 1' + 2') |
| B | 2 | 28 & 7 | LB700 + HB2600 | N | 1' + 2 (or 1' + 2') |
| C | 2 | 5 & 1 | LB850 + MB2100 | N+1 | 3' |
| D | 2 | 5 & 7 | LB850 + HB2600 | N+1 | 3' (or 3) |
| E | 2 | 1 & 7 | MB2100 + HB2600 | N+1 | 3' |
| E' | 2 | 1 & 7 | MB2100 + HB2600 | N | 1' + 2' |
| F | 3 | 5 & 1 & 7 | LB850 + MB2100 + HB2600 | N+1 | 3' |
| G | 3 | 28 & 1 & 7 | LB700 + MB2100 + HB2600 | N | 1' + 2' |

• NFET Switch only, or switch with binary weighted tunable capacitor

ANTENNA TUNING AND RESONANCE ADJUSTMENT SYSTEM AND METHOD

RELATED APPLICATIONS

This application claims priority to and the benefit of U.S. Provisional patent Application No. 62/967,291, entitled "ANTENNA TUNING AND RESONANCE ADJUSTMENT SYSTEM AND METHOD," filed Jan. 29, 2020, the contents of which are hereby incorporated herein by reference in its entirety as if fully set forth below and for all applicable purposes.

FIELD

The present disclosure relates generally to electronics, and more specifically to antenna adjustment circuits for communication devices.

BACKGROUND

In a radio frequency (RF) transceiver, a communication signal is typically amplified and transmitted by a transmit section and received and amplified by a receiver section. Both transmit and receive signals emanate from and are received by a transducer, typically referred to as an antenna. A communication device may be capable of transmitting and receiving signals on a variety of different frequency bands. Further, the communication device may be capable of transmitting and receiving on different frequency bands simultaneously. A communication device may comprise one or more antennas, and one or more of the antennas may be used to simultaneously transmit and receive signals on the different frequency bands.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an antenna tuner including a control core, a switch logic coupled to the control core, the switch logic comprising a variable off-capacitance, and an electrical coupling coupled to the switch logic, the electrical coupling configured to connect the switch logic to an antenna system.

Another aspect of the disclosure provides an antenna tuner coupled to an antenna, the antenna tuner having a variable off-capacitance, the antenna having an antenna response, and an antenna tuner control configured to provide a control signal to the antenna tuner to configure the variable off-capacitance such that a first resonance appearing at a first initial frequency is shifted to a first adjusted frequency based on a combination of communication bands selected for use with the antenna.

Another aspect of the disclosure provides an antenna tuning system, including an antenna tuner coupled to an antenna, the antenna tuner having a variable off-capacitance, the antenna having an antenna response, antenna tuner logic having a frequency/band list, a frequency/band combination logic and a lookup table, the antenna tuner logic configured to provide a control signal to the antenna tuner to configure the variable off-capacitance such that a first resonance appearing at a first initial frequency is shifted to a first adjusted frequency based on a combination of communication bands selected by the frequency/band combination logic.

Another aspect of the disclosure provides a method for communication including selecting a tuner state, and tuning an antenna having an antenna response using an antenna tuner to shift a first resonance appearing at a first initial frequency to a first adjusted frequency based on the selected tuner state.

Another aspect of the disclosure provides a device for communication including means for selecting a tuner state, and means for tuning an antenna having an antenna response using an antenna tuner to shift a first resonance appearing at a first initial frequency to a first adjusted frequency based on the selected tuner state.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 5 is a diagram showing an example of a frequency/band list that may be contained in the communication frequency/band list of FIG. 2 or FIG. 3.

FIG. 9 is a drawing showing an example of a lookup table of FIG. 3.

FIG. 15 is a drawing showing an example of a lookup table of FIG. 3.

DETAILED DESCRIPTION

The word "exemplary" is used herein to mean "serving as an example, instance, or illustration." Any aspect described herein as "exemplary" is not necessarily to be construed as preferred or advantageous over other aspects.

Exemplary embodiments of the disclosure are directed to an antenna aperture tuning system and method that can adjust the frequency of a resonance so that the antenna can efficiently communicate over a wide range of frequencies and frequency bands. There are instances where it is desirable for a communication device to simultaneously communicate over two different frequencies that may lie in different frequency bands. For example, when a communication device is communicating using ENDC (E-UTRAN New Radio Dual Connectivity), or when the communication device is employing carrier aggregation (CA), the communication device may be simultaneously communicating over two or more different frequencies or frequency bands. Due to the presence of a resonance in the antenna circuitry, the antenna may be efficient when communicating on one of the frequency bands, but may be less efficient when communicating on the other frequency band. An antenna aperture tuning system and method may be used to adjust the frequency of a resonance so that the antenna system may be efficient when communicating in two or more frequency bands. In an exemplary embodiment, the antenna aperture tuning system and method described herein may be implemented in a new radio (NR), or a 5G communication system.

Figure 1:
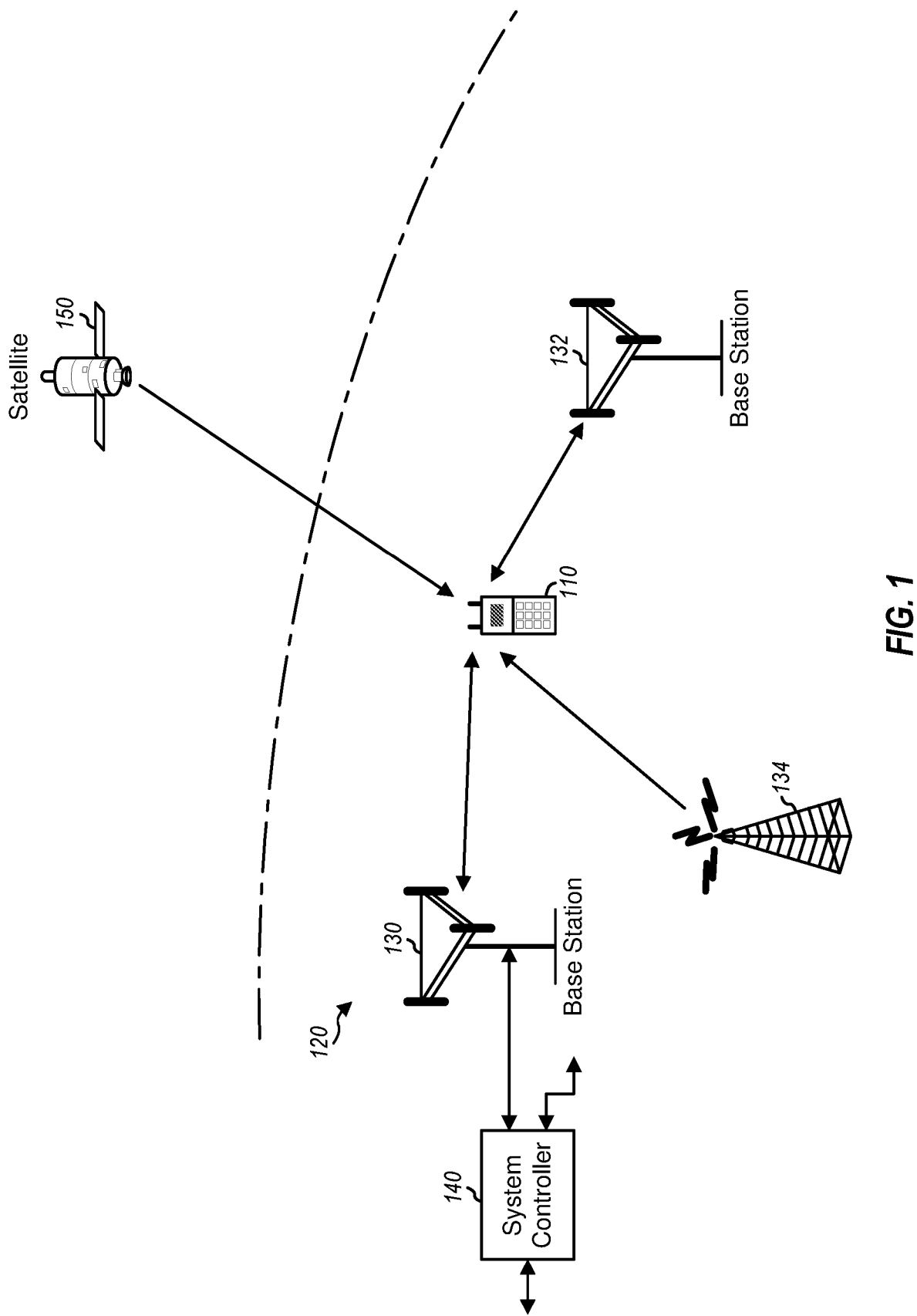
FIG. 1 is a diagram showing a wireless device communicating with a wireless communication system.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, a drone, a vehicle, a wearable device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1×, EVDO, TD-SCDMA, GSM, 802.11, 5G, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2:
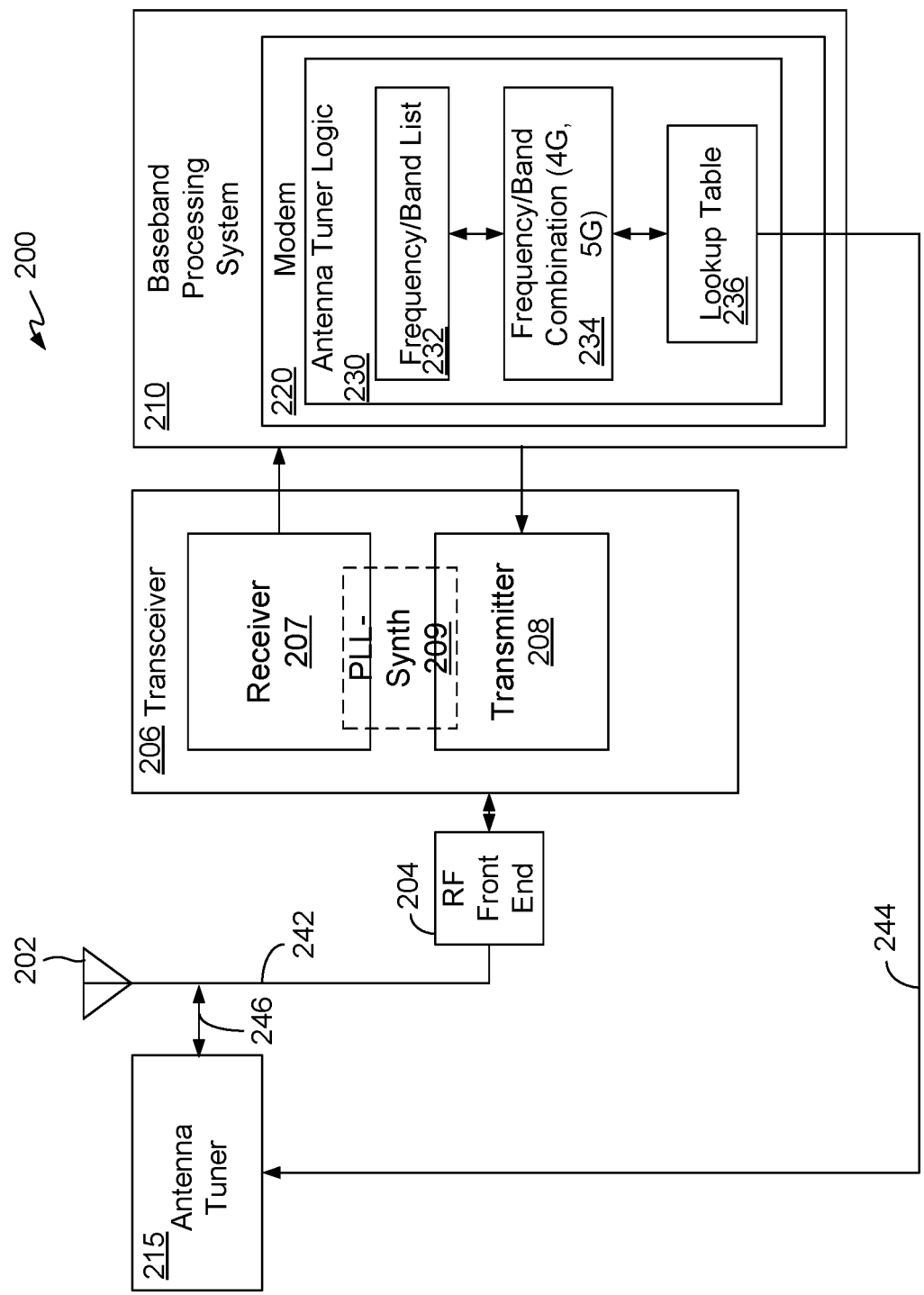
FIG. 2 is a block diagram showing a wireless device in which the exemplary techniques of the present disclosure may be implemented.

FIG. 2 is a block diagram showing a wireless device 200 in which the exemplary techniques of the present disclosure may be implemented. Wireless device 200 may be an example of above-described wireless device 110 (FIG. 1). For example, wireless device 200 may be a 5G smartphone, WLAN (e.g., WiGig) router, or other communication device. In some embodiments, the wireless device 200 may be an embodiment of base station 130 or 132, or the transmit portion of the wireless device 200 may be implemented in broadcast station 134. Wireless device 200 is shown in simplified form, illustrating primarily the elements that comprise the exemplary techniques of the present disclosure. In an exemplary embodiment, wireless device 200 may include an antenna 202, a radio frequency (RF) front end 204, a transceiver 206 having a receiver portion 207 and a transmitter portion 208, and a baseband processing system 210. A phase locked loop (PLL)-synthesizer 209 is shown in dotted line spanning the receiver portion 207 and the transmitter portion 208 to indicate that the transceiver 206 may be configured to be tuned to a particular transmit frequency and a particular receive frequency. Further, the PLL-synthesizer 209 may be configured by the modem 220 to tune the receiver portion 207 and the transmitter portion 208 to two or more receive frequencies and two or more transmit frequencies simultaneously. The antenna 202 may include one or more antenna elements, for example in an array configuration, and may be coupled to the RF front end 204 over connection 242 and may be coupled to an antenna tuner 215, also referred to as an antenna aperture tuner, or tuner, over connection 246, which may also be referred to as an antenna aperture port. In an exemplary embodiment, the antenna tuner 215 may comprise a switch or a series of switches that can be selectively enabled and disabled to affect the impedance presented at connection 246, and therefore control or alter the resonant response and/or input matching (presented at connection 242) of the antenna 202. The antenna tuner 215 may comprise a switch or a series of switches that can be selectively enabled and disabled that can affect the capacitance, particularly, the off-capacitance of the switch or switches, to control or alter the circuit resonances of the antenna tuner 215, or control/alter the parasitic circuit resonances and the antenna resonances of the combination of the antenna tuner 215, the connection 242, and the antenna 202. For example, in an exemplary embodiment, correctly selecting the resonance of the antenna 202 by adjusting the antenna tuner 215 can provide a desired relatively high radiation efficiency, and in contrast, a parasitic, or unwanted circuit resonance, may result in a relatively low antenna radiation efficiency. Therefore, in an exemplary embodiment, the antenna tuner 215 can be selectively controlled and adjusted to provide an antenna resonance that results in a desired relatively high antenna radiation efficiency. The antenna 202 may comprise one or more antennas or antenna elements configured to transmit and receive signals over one or more frequency bands. The antenna 202 may be configured to simultaneously transmit and receive signals over two or more communication bands or frequencies.

The data processor 210 may include a memory (not shown) to store data and program codes, and may generally comprise analog and/or digital processing elements. The transceiver 206 may support bi-directional communication. In general, wireless device 200 may include any number of transmitters and/or receivers for any number of communication systems and frequency bands. All or a portion of the transceiver 206 may be implemented on one or more analog integrated circuits (ICs), RF ICs (RFICs), mixed-signal ICs, etc.

The receiver portion 207 and the transmitter portion 208 may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

In an exemplary embodiment, the baseband processing system 210 may comprise a modem 220, which may comprise antenna tuner logic 230. The antenna tuner logic 230 may comprise a frequency/band list 232, a frequency/band combination element 234, and lookup table 236. Although shown as separate elements, the frequency/band list 232, frequency/band combination element 234 and the lookup table 236 may be part of a single logic or processing element. Although shown as part of the modem 220, the antenna tuner logic 230 may also be incorporated into the transceiver 206, or into an element that may include portions of a transceiver and portions of a modem. The antenna tuner logic 230 may be a controller, or perform a control function that could encompass, logic, software, firmware, hardware, such as, for example, dedicated or dynamically configured circuitry, etc.

In an exemplary embodiment, the antenna tuner 215 may be coupled to the baseband processing system 210 over a connection 244. The connection 244 may be a dedicated connection, or may be a communication bus. For example, the connection 244 may comprise at least a portion of a communication bus, such as a MIPI (mobile industry processor interface) interface, such that the modem 220, and in particular, the antenna tuner logic 230, may communicate instructions to the antenna tuner 215 to allow the antenna tuner 215 to affect and at least partially control circuit resonances that may affect the resonant response of the antenna 202 for transmit and receive signals.

The wireless device 200 may support communication over a wide range of frequency bands and frequencies, ranging from, for example, one or more low bands having frequencies as low as the 400 MHz range, to one or more high bands having frequencies up to approximately 2.8 GHz range or higher. The wireless device 200 may also support communication over 5G frequencies and frequency bands up to, for example, 7.2 GHz or higher. In an exemplary embodiment, the wireless device 200 may be capable of simultaneous communication over different frequencies or different frequency bands using one or more of ENDC (E-UTRAN New Radio Dual Connectivity), or carrier aggregation (CA).

Certain elements of the transceiver 206 are functionally illustrated in FIG. 2, and the configuration illustrated therein may or may not be representative of a physical device configuration in certain implementations. For example, as described above, transceiver 206 may be implemented in various integrated circuits (ICs), RF ICs (RFICs), mixed-signal ICs, etc. In some embodiments, the transceiver 206 is implemented on a substrate or board such as a printed circuit board (PCB) having various modules.

Figure 3:
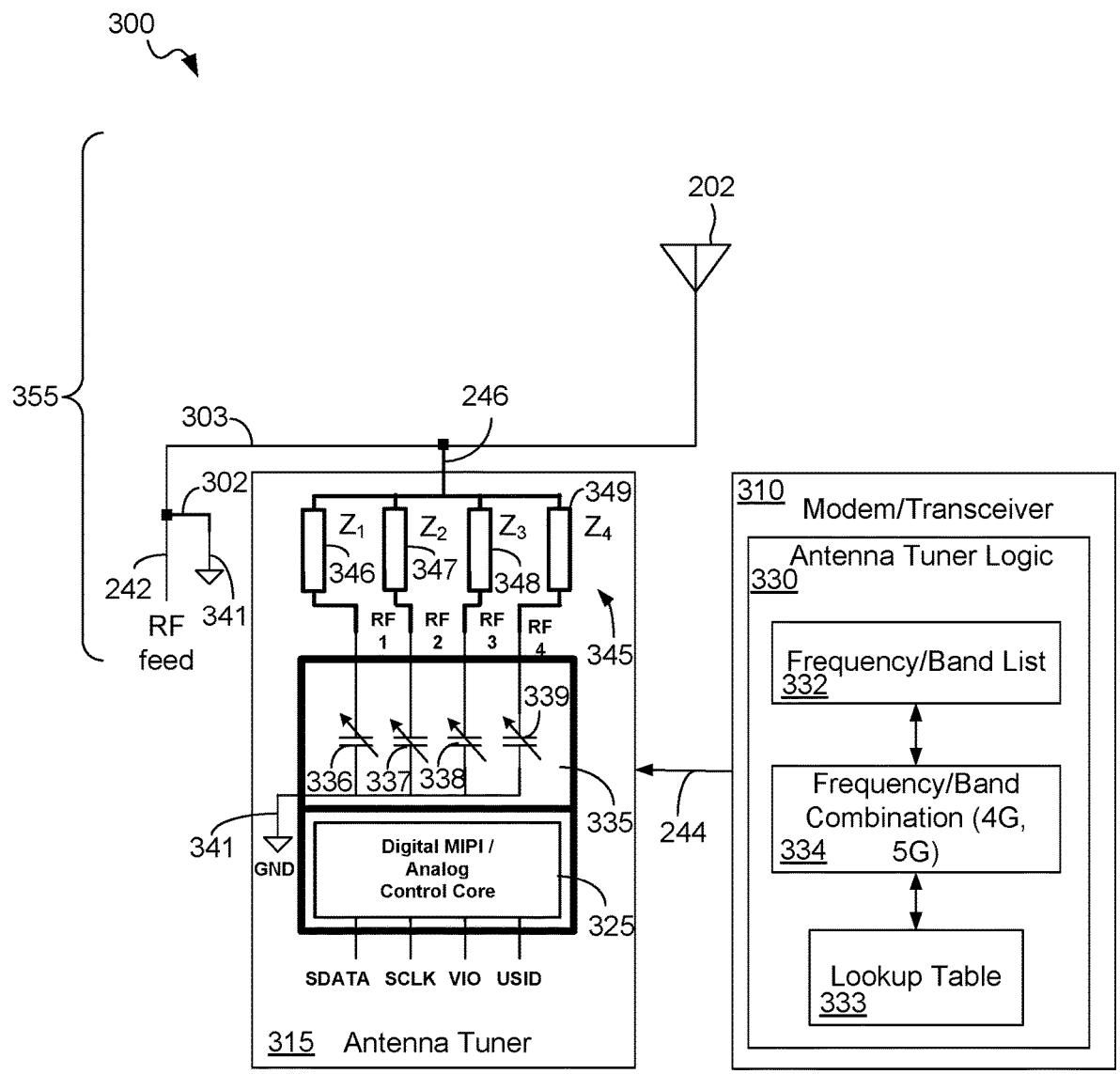
FIG. 3 is a block diagram showing a more detailed view of portions of the wireless device of FIG. 2.

FIG. 3 is a block diagram showing a more detailed view of portions of the wireless device 200 of FIG. 2. In an exemplary embodiment, portions of the transceiver 206 and the baseband processing system 210 of FIG. 2 are illustrated in FIG. 3 as a modem/transceiver 310 to illustrate that the antenna tuner logic 330 may be implemented in a modem, in a transceiver, in an element that combines the functions of a modem and a transceiver, or elsewhere, depending on application and implementation.

In an exemplary embodiment, an antenna system 355 may comprise the antenna 202, which may also be referred to as a radiator, the connection 246 to the antenna tuner 315, another connection 303 that may couple the antenna (or radiator) 202 or array of antennas 202 to the connection 246 and/or RF feed 242 or that may be representative of a portion of the antenna 202 (described further below), an optional shorting pin 302 to ground, and the RF feed 242. While the antenna 202 is illustrated as being separate from the connection 303, it will be understood that 303 may be representative of a portion of the antenna, for example a portion that extends between a terminal end of the antenna at 202 and at least the RF feed 242 (and potentially the shorting pin 302). In an exemplary embodiment, the antenna aperture port 246 is coupled to the antenna portion 303 at a first location and the RF feed 242 is coupled to the antenna portion 303 at a second location, where the second location having the RF feed 242 is spaced apart from the first location having the antenna aperture port 246. While the shorting pin 302 is illustrated as being coupled to the antenna portion 203 at a location more proximate to the terminal end at 202 than the RF feed 242, it will be understood that the RF feed 242 may be disposed along the antenna portion 303 between the shorting pin 302 and the terminal end at 202. For example, an end of the antenna portion 303 opposite 202 may terminate at the shorting pin 302. In an exemplary embodiment, the resonance (or resonant) frequency, input matching and radiation efficiency of the antenna system 355 can be altered by switchable variable impedances and capacitances in the antenna tuner 315. Input matching refers to the impedance of the RF feed 242 and the quality of the RF power transfer to/from the RF front end 204 (FIG. 2).

In an exemplary embodiment, an antenna tuner 315 may comprise a control core 325 coupled to a switch logic 335. The switch logic 335 may be coupled to an electrical coupling 345, which may be coupled to the RF feed connection 242, the connection 303 and the antenna 202 over connection 246.

The control core 325 may comprise logic configured to receive a control signal over connection 244 from the antenna tuner logic 330. In an exemplary embodiment, the control signal sent over connection 244 may comprise a MIPI command. For example, depending on the communication bands available and the communication bands selected by the frequency/band list 332, the frequency/band combination element 334 and the lookup table 333, a MIPI command sent by the antenna tuner logic 330 over connection 244 to the antenna tuner 315 may instruct the control core 325 to alter the state of the switch logic 335 according to selected frequencies tuned to by the PLL-synthesizer 209 (FIG. 2) of the wireless device 200. For example, the antenna tuner 315, and in particular the switch logic 335, may be configured for multiple tuner states, for example only, tuner state "N" and tuner state "N+1." Tuner state "N" may use selected frequency bands and combinations of frequency bands and antennas for transmission and reception and tuner state N+1 may use different selected frequency bands and combinations of frequency bands and antennas for transmission and reception. The state of the antenna tuner 315 (FIG. 3) combined with the off-capacitance provided by the switch logic 335, may control the location of circuit resonances that may affect the antenna response of the antenna 202. Further, parasitic circuit resonances in the antenna tuner 315 and/or system resonances in the antenna system 355 may also be controlled for the particular frequency/band combination selected by the frequency/band combination element 334 and lookup table 333. In this manner, a circuit resonance that may compromise the antenna response for a particular frequency or frequency band may be shifted, or moved, by the antenna tuner 315 to a different frequency or frequency band such that it does not compromise the antenna response.

In an exemplary embodiment, the switch logic 335 is illustrated as having four (4) variable capacitances 336, 337, 338 and 339, each variable capacitance 336, 337, 338 and 339 having an adjustable, or variable, off-capacitance. Each of the variable capacitances 336, 337, 338 and 339 may function as a switch, in which an ON-state may be used to set the tuner state "N" and tuner state "N+1" of the wireless device 200 in this two state example, and an OFF-state having an off-capacitance. Each variable capacitance 336, 337, 338 and 339 is shown as being respectively coupled to four (4) respective RF connections (RF1, RF2, RF3 and RF4) by four respective impedances 346, 347, 348 and 349. In an exemplary embodiment, the impedances 346, 347, 348 and 349 may be implemented using inductances, capacitors, resistors or short circuits.

Although shown as impedances for ease of illustration, the electrical coupling 345 may alternatively be implemented as variable inductances, variable capacitances, variable resistances or short circuits, or any combination thereof. Further, although illustrated as variable capacitances, the switch logic 335 may comprise a combination of switches and capacitances with the switch logic 335 providing an on-off switch function and a variable capacitance function between the control core 325 and the electrical coupling 345. In an exemplary embodiment, the switch logic 335 is configured to provide a variable off-capacitance.

In an exemplary embodiment, the antenna tuner 315 is shown as having four (4) RF connections (RF1, RF2, RF3 and RF4) with four respective impedances 346 (Z1), 347 (Z2), 348 (Z3) and 349 (Z4) coupling the variable capacitances 336, 337, 338 and 339 to the antenna 202 over connection 246. The variable capacitances 336, 337, 338 and 339 may also be coupled to a system ground 341.

The RF communication signal is provided over connection 242 and an optional shorting pin 302 is shown as being coupled to a system ground 341. The optional shorting pin 302 is also coupled to connection 303, which forms part of the antenna system 355.

In an exemplary embodiment, the capacitance provided by each variable capacitance 336, 337, 338 and 339 in the switch logic 335 is determined according to the frequency/band list 332, the frequency/band combination element 334 and the lookup table 333. In an exemplary embodiment, the resonant response of each antenna in the antenna 202 is known. Further, the resonant response of the antenna system 355 and the antenna tuner 315 is known. Using the known antenna response(s), the frequency/band list 332, the frequency/band combination element 334 and the lookup table 333 may be developed so as to create a desired tuner state (such as tuner state N, and tuner state N+1 in this example) and a desired circuit resonance response (referred to herein as resonance mover states 1, 1', 1", to be described below) for each tuner state. The resonance mover state may include the variable capacitance state of the variable capacitances 336, 337, 338 and 339 for each frequency band combination corresponding to tuner state N, tuner state N+1, etc. The tuner state (N, N+1) and circuit resonance response can be considered as two separate independent variables which together define the overall response for the antenna tuner 315. As will be described below, depending on the frequency/band combination, the antenna tuner logic 330 will select a certain pre-determined state for the antenna tuner 315, and communicate the state to the antenna tuner 315 using, for example, a MIPI command over connection 244. In an exemplary embodiment, the pre-determined tuning state for a wireless device 200 may comprise, the state of the switch logic 335 (for example, state N, N+1, etc.) combined with a resonance mover state (for example, state 1, state 1', state 2, state 2', etc., shown below). The resonance mover state determines the off-state capacitance value of the variable capacitances 336, 337, 338 and 339. The value of the variable capacitances 336, 337, 338 and 339 may also influence the main tuning state of the antenna tuner 315 and therefore may influence the resonance frequency and/or efficiency of the antenna system 355, including the resonant frequency of the antenna 202. As used herein, the term "resonance mover state" or "RM state" refers to the amount, if any, of off-capacitance provided by the switch logic 335 in the antenna tuner 315 to the electrical coupling 345 and to the antenna system 355, under the control of the antenna tuner logic 330 in the modem/transceiver 310 (FIG. 3), and to what frequency a circuit resonance in the antenna system 355 may be shifted by adjusting the off-capacitance provided by the switch logic 335 (FIG. 3). Depending on the frequency band combination 334 and lookup-table 333, the antenna tuner 315 may be off, where it does not influence a circuit resonance or move a circuit resonance in the antenna system 355 to another frequency, or may be enabled and configured to provide a variable amount of off-capacitance to move a circuit resonance in the antenna system 355 from a first (or initial) frequency to a second (or adjusted) frequency.

A circuit resonance can occur in the antenna system 355, and in particular due to interaction of the antenna radiator 303 combined with the aperture port (connection) 246 and the antenna tuner 315. The resonance frequency (s) of the antenna system 355 and associated relatively high antenna radiation efficiency can be tuned by the antenna tuner 315 and will be shown below. A circuit resonance may negatively affect the antenna radiation efficiency and degrade multi-band concurrent performance. In contrast, antennas can exhibit multiple antenna resonances, some of which can be tuned in frequency by the antenna tuner circuit 315. Some of these antenna resonances may be associated with relatively high radiation efficiency.

In a first exemplary embodiment, the antenna system 355 and the antenna tuner 315 can be configured in such a way that performance degrading circuit resonances can be moved out of a frequency band of interest, while keeping the desired antenna resonances at the desired frequencies (i.e., slightly moving a circuit resonance to another frequency). In another exemplary embodiment, the antenna tuner 315 also changes the antenna resonance considerably to tune its efficiency frequency response to a desired band of interest. Due to tuning the antenna resonance frequency by means of adjusting the capacitance provided by the switch logic 335, a relatively high antenna system radiation efficiency in and around the frequency band(s) of interest is achieved.

Figure 4:
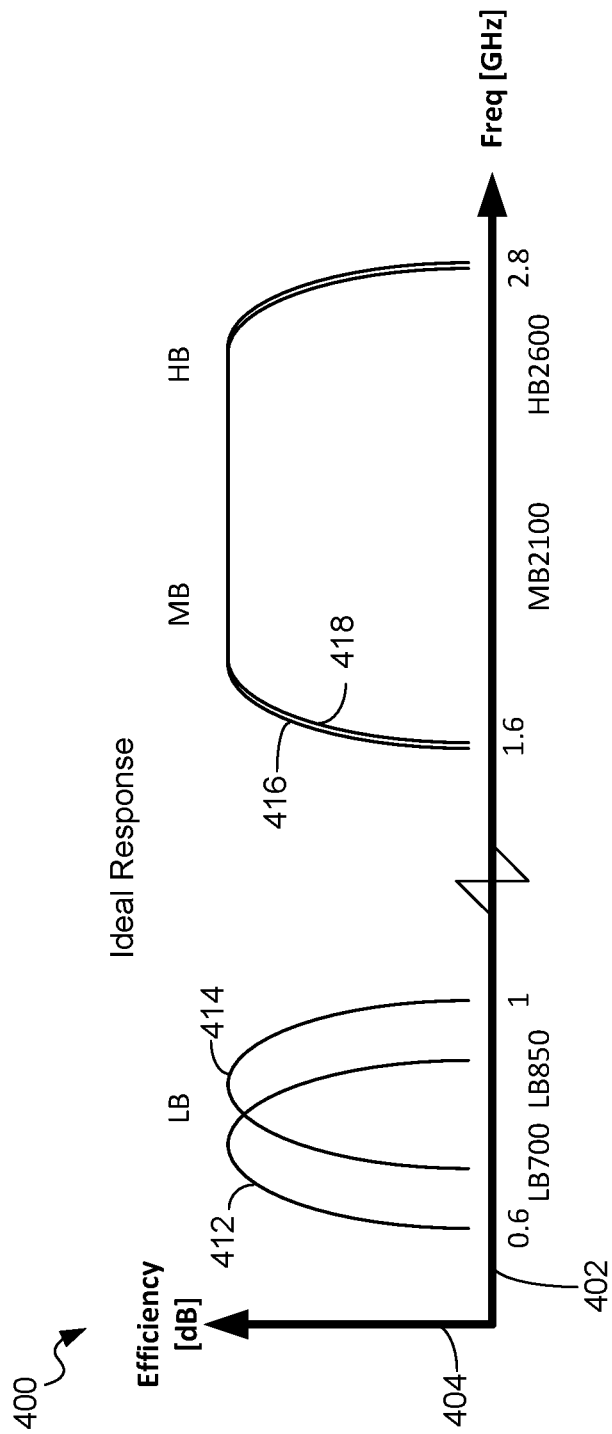
FIG. 4 is a portion of a communication spectrum showing ideal antenna response for a plurality of exemplary communication bands.

FIG. 4 is a portion of a communication spectrum 400 showing ideal antenna response for a plurality of exemplary communication bands. The horizontal axis 402 shows frequency (in GHz) increasing to the right and the vertical axis 404 shows antenna efficiency (in dB) increasing upwardly. In an exemplary embodiment, the communication spectrum 400 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 4 for example purposes only.

In FIG. 4, a sample low-band antenna response 412 is shown with a center frequency of approximately 0.7 GHz (referred to as LB700, band 28), and a sample low-band antenna response 414 is shown with a center frequency of approximately 0.85 GHz (referred to as LB850, band 5). Sample mid-band and high-band antenna responses 416 and 418 are shown spanning a frequency range of approximately 1.6 GHz to approximately 2.8 GHz, with a mid-band frequency of approximately 2.1 GHz (referred to as MB2100, band 1) and a high-band frequency of approximately 2.7 GHz (referred to as HB2600, band 7) shown for example purposes only. The mid-band and the high-band may also be referred to as mid-high band (MHB). The bands described herein are for exemplary purposes only. The techniques discussed herein are applicable to other frequencies, other frequency bands, and other communication bands.

In an ideal antenna aperture tuning example, the low-band may be tuned in several sub-bands (generally tuned to one LB at a time, sometimes two LB-LB pairs). The number of throws, and/or combinations of throws in the switch logic 335 (FIG. 3) determines the number of sub-bands. The mid-band and high-band (and mid-high-band (MHB) are (ideally) not tuned by an antenna aperture tuner because the MHB response of the antenna 202 (FIG. 2) is typically sufficient to cover the complete MHB bandwidth without tuning.

In an exemplary embodiment, it is also possible to have a configuration in which mid-band and ultra-high-band (UHB) (for example, approximately 3.3 GHz to approximately 5 GHz) antennas are aperture tuned. In such an example, UHB antennas may comprise small 5G antennas, and may be so small that full mid-band/high-band simultaneous coverage is difficult to achieve. In such an example, the MHB may be tuned into several sub-bands and the UHB would not be tuned by an antenna aperture tuner. Further, there are some application that also include a WiFi antenna, in the approximate frequency ranges of 5 GHz to 7.2 GHz. Accordingly, the exemplary techniques disclosed herein are applicable to many more frequencies and frequency bands than the ones shown herein as exemplary embodiments.

In an exemplary embodiment, it may be desirable for a communication device, such as the wireless communication device 200, to communicate simultaneously on multiple frequencies, such as, for example only, over a low-band frequency and a mid-band or high-band frequency. For example, it may be desirable for the wireless communication device 200 to communicate simultaneously on communication band LB700 (band 28) and MB2100 (band 1), or, for example, LB850 (band 5) and HB2600 (band 7), or other combinations of bands. It is also possible for a communication device to communicate simultaneously on more than two bands, such as, for example, on communication band LB700 (band 28), on communication band MB2100 (band 1) and on communication band MB2600 (band 7); or on communication band LB850 (band 5), on communication band MB2100 (band 1) and on communication band MB2600 (band 7).

FIG. 5 is a diagram showing an example of a frequency/band list 500 that may be contained in the communication frequency/band list 232 of FIG. 2 or 332 of FIG. 3. In an exemplary embodiment, the frequency/band list 500 corresponds to the communication frequencies and bands described in FIG. 4, and may be an exemplary embodiment of the frequency/band list 232 of FIG. 2 or the frequency/band list 332 of FIG. 3.

In an exemplary embodiment, the frequency/band list 500 includes rows 502 describing different communication bands. A column 504 refers to a communication band number, a column 506 refers to the communication band name, a column 508 refers to the downlink frequency (in MHz) of the communication band, and a column 510 refers to the uplink frequency (in MHz) of the communication band.

For example, in the frequency/band list 500, band 28 corresponds to LB700, has a downlink frequency range of 758 MHz to 803 MHz, and has an uplink frequency range of 703 MHz to 748 MHz. Band 5 corresponds to LB850, and has a downlink frequency range of 869 MHz to 894 MHz, and has an uplink frequency range of 824 MHz to 849 MHz. Band 1 corresponds to MB2100, and has a downlink frequency range of 2110 MHz to 2170 MHz, and has an uplink frequency range of 1920 MHz to 1980 MHz. Band 7 corresponds to HB2600, and has a downlink frequency range of 2620 MHz to 2690 MHz, and has an uplink frequency range of 2500 MHz to 2570 MHz. The information shown in the communication frequency and band list 500 is shown for illustrative purposes only.

Figure 6:
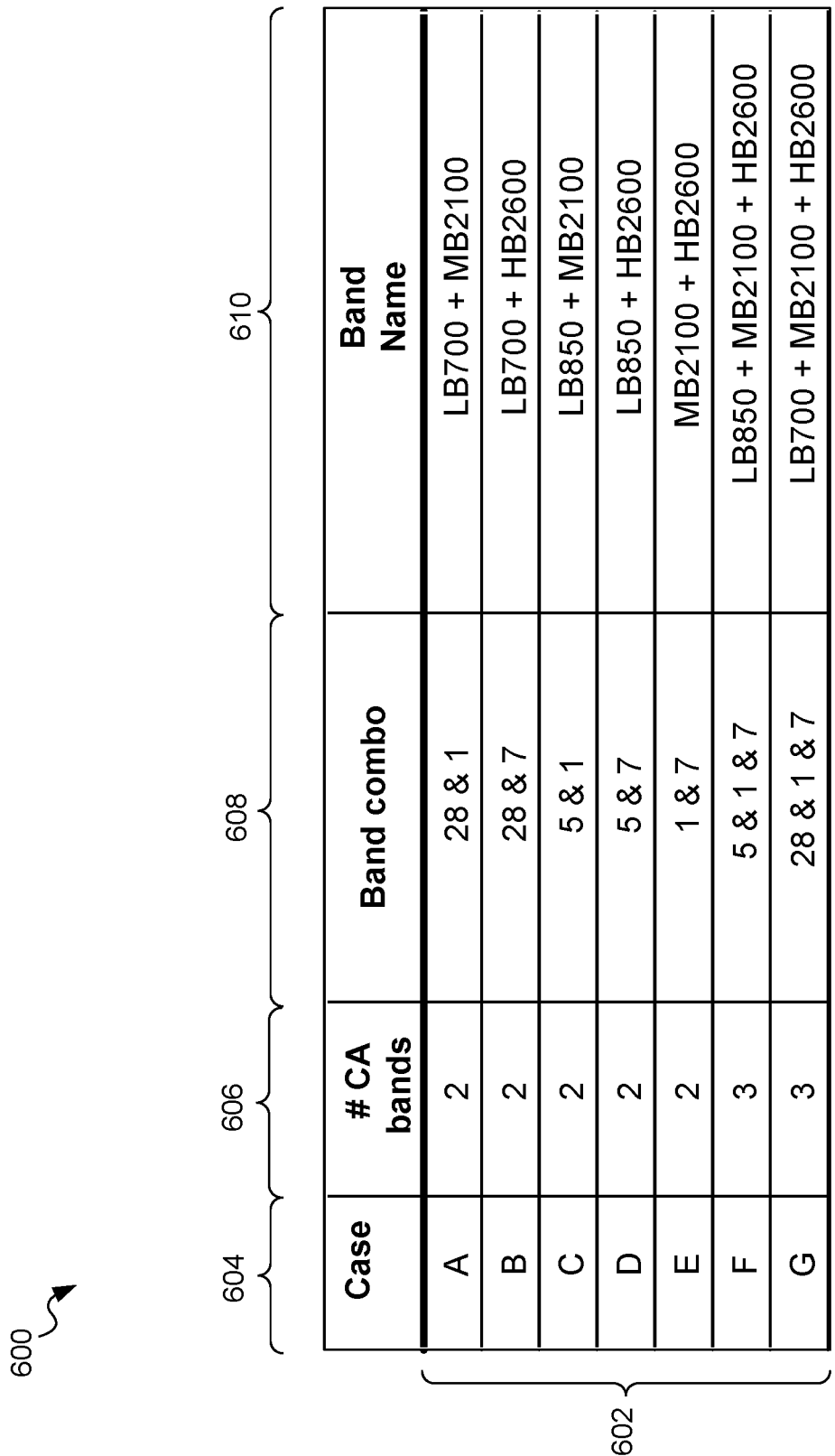
FIG. 6 is a diagram showing the contents of an example of a communication frequency/band combination element of FIG. 3.

FIG. 6 is a diagram showing the contents of an example of a communication frequency/band combination element. In an exemplary embodiment, the frequency/band combination element 600 corresponds to the communication frequencies and bands described in FIG. 4, and may be an exemplary embodiment of the frequency/band combination element 234 of FIG. 2 or the frequency/band combination element 334 of FIG. 3.

In an exemplary embodiment, the frequency/band combination element 600 includes rows 602 describing different instances of communication band combinations. A column 604 refers to a communication implementation (case), a column 606 refers to the number of communication bands, abbreviated CA bands for carrier aggregation, a column 608 refers to the combination of communication bands, and a column 610 refers to the name of the communication bands. For example, case A describes simultaneous communication on two carrier aggregation (CA) bands over band 28 (LB700) and band 1 (MB2100). Case B describes simultaneous communication on two carrier aggregation (CA) bands over band 28 (LB700) and band 7 (HB2600). Case C describes simultaneous communication on two carrier aggregation (CA) bands over band 5 (LB850) and band 1 (MB2100). Case D describes simultaneous communication on two carrier aggregation (CA) bands over band 5 (LB850) and band 7 (HB2600). Case E describes simultaneous communication on two carrier aggregation (CA) bands over band 1 (MB2100) and band 7 (HB2600). Case F describes simultaneous communication on three carrier aggregation (CA) bands over band 5 (LB850), band 1 (MB2100) and band 7 (HB2600). Case G describes simultaneous communication on three carrier aggregation (CA) bands over band 28 (LB700), band 1 (MB2100) and band 7 (HB2600).

Figure 7:
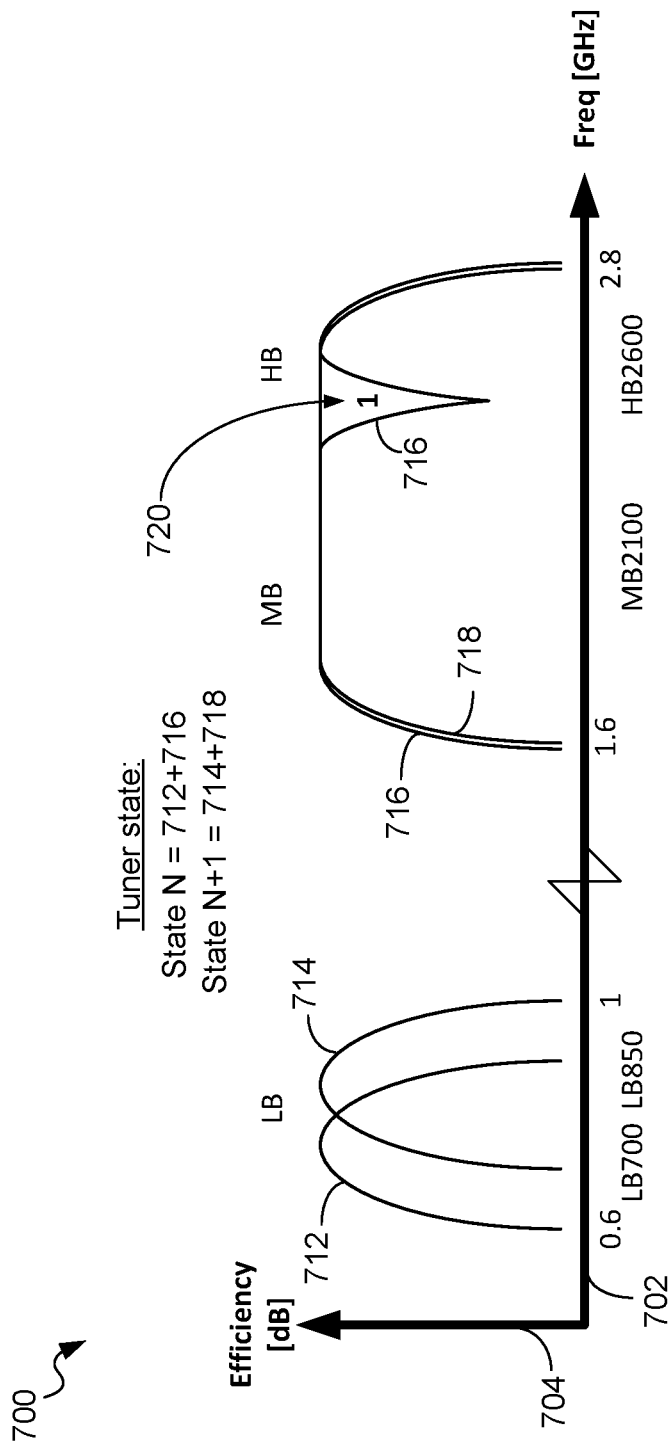
FIG. 7 is a portion of a communication spectrum showing non-ideal antenna response for at least one of a plurality of communication bands.

FIG. 7 is a portion of a communication spectrum 700 showing non-ideal antenna response for at least one of a plurality of communication bands. The horizontal axis 702 shows frequency (in GHz) increasing to the right and the vertical axis 704 shows antenna efficiency (in dB) increasing upwardly. In an exemplary embodiment, the communication spectrum 700 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 7 for example purposes only.

In FIG. 7, a sample low-band antenna response 712 is shown with a center frequency of approximately 0.7 GHz (LB700), and a sample low-band antenna response 714 is shown with a center frequency of approximately 0.85 GHz (LB850). Sample mid-band and high-band antenna responses 716 and 718 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, a first tuner state, state N, may comprise simultaneous communication on LB700 (band 28) and on MB2100 (band 1) or HB2600 (band 7) using antenna response 712 and antenna response 716, which includes a circuit resonance 720; and a second tuner state, state N+1, may comprise simultaneous communication on LB850 (band 5) and on MB2100 (band 1) or HB2600 (band 7) using antenna response 714 and antenna response 718, which does not include a circuit resonance.

In an exemplary embodiment, the antenna response 716 includes a circuit resonance 720 located at approximately 2.6 GHz, which causes a non-ideal, or compromised, antenna response in the high-band in this example, leading to a significant decrease in antenna efficiency at the affected frequency, which in this example, is the frequency corresponding to band 7 (HB2600) for the antenna response 716.

Figure 8:
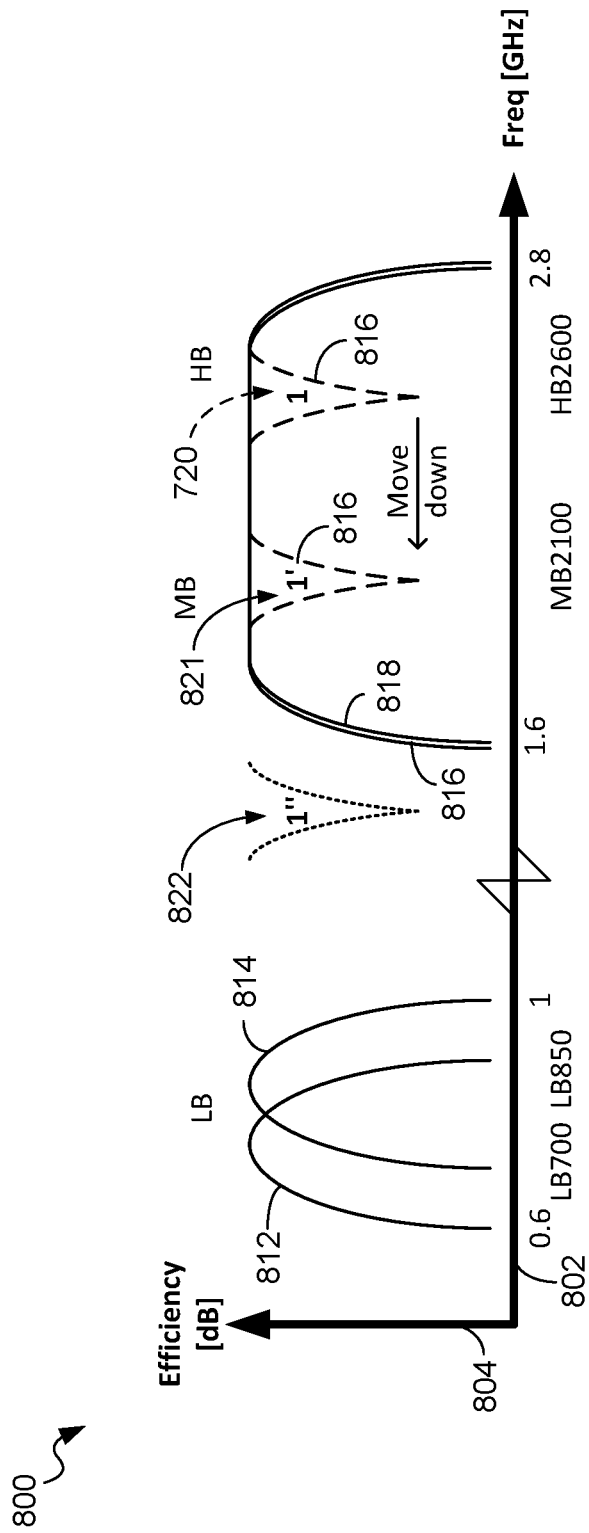
FIG. 8 is a portion of a communication spectrum showing an exemplary embodiment of shifting the circuit resonance of FIG. 7 in accordance with an exemplary embodiment of the disclosure.

FIG. 8 is a portion of a communication spectrum 800 showing an exemplary embodiment of shifting the circuit resonance 720 of FIG. 7 in accordance with an exemplary embodiment of the disclosure.

The horizontal axis 802 shows frequency (in GHz) increasing to the right and the vertical axis 804 shows antenna efficiency (in dB) increasing upwardly. In an exemplary embodiment, the communication spectrum 800 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 8 for example purposes only.

In FIG. 8, a sample low-band antenna response 812 is shown with a center frequency of approximately 0.7 GHz (LB700), and a sample low-band antenna response 814 is shown with a center frequency of approximately 0.85 GHz (LB850). Sample mid-band and high-band antenna responses 816 and 818 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, the circuit resonance 720 (FIG. 7) shown in the antenna response 816 is shown in dotted line to indicate that the antenna tuner 315 (FIG. 3), under the control of the antenna tuner logic 330 (FIG. 3), has altered a circuit resonance response of the antenna tuner 315 and the antenna system 355 (FIG. 3) away from 2.6 GHz, resulting in the movement of the circuit resonance 720 away from the band of interest, which in this case is the high-band frequency of approximately 2.6 GHz. In one of the exemplary embodiments shown in FIG. 8, the circuit resonance 720 is shifted to a lower frequency, for example, to a frequency of approximately 2.1 GHz, so it appears as circuit resonance 821. In this example, the designation of "(1')" for the circuit resonance 821 corresponds to the resonance mover state (1') of the antenna tuner 315. In this example, there is no communication occurring on band 1 (MB2100), such that shifting the circuit resonance 821 to 2.1 GHz does not jeopardize communication. In this exemplary embodiment, it is assumed that simultaneous communication may be occurring on a low-band frequency and on a high-band frequency, such that the occurrence of the circuit resonance 821 at an approximate frequency of 2.1 GHz does not negatively impact the simultaneous communication.

In another exemplary embodiment shown in FIG. 8, the circuit resonance 720 is shifted to a different lower frequency, for example, to a frequency of approximately below 1.6 GHz, so it appears as circuit resonance 822 (resonance mover state 1"), which is outside of the mid-band and high-band frequency ranges. In such an example, simultaneous communication may occur on a low-band frequency and on a mid-band frequency; or may occur on a low-band frequency and on a high-band frequency, such that the occurrence of the circuit resonance 822 at an approximate frequency of below 1.6 GHz does not negatively impact the simultaneous communication.

In an exemplary embodiment, the circuit resonance 720 may be selectively shifted by changing the variable off-capacitance value presented by the switch logic 335 in the antenna tuner 315 (FIG. 3) to the electrical coupling 345 and to the antenna system 355, including the antenna 202 (FIG. 3) according to a control signal sent to the antenna tuner 315 (FIG. 3) by the antenna tuner logic 330 (FIG. 3).

FIG. 9 is a drawing showing an example of a lookup table 900. In an exemplary embodiment, the lookup table 900 may be an example of the lookup table 236 of FIG. 2 or the lookup table 333 of FIG. 3. In an exemplary embodiment, the lookup table 900 corresponds to FIG. 8.

In an exemplary embodiment, instead of or in addition to the frequency/band list 332, frequency/band combination element 334, and lookup table 333, the antenna tuner logic 330 (FIG. 3) may alternatively comprise logic or circuitry that may perform a calculation, or execute an equation that determines how much to shift a circuit resonance based on a communication band being used. For example, a set of registers and/or a separate hardware circuit with various options encoded therein may be used instead of a lookup table. Alternatively, the antenna tuner logic, and alternative embodiments therefor, may be stored and implemented in the control core 325 of the antenna tuner 315. The example of the frequency/band list 332, frequency/band combination element 334, and lookup table 333 is one example of the elements that may perform the antenna tuning described herein. The example of the frequency/band list 332, frequency/band combination element 334, and lookup table 333 shown herein could be implemented in these various other ways. In an exemplary embodiment, the lookup table 900 includes rows 902 describing different band combinations that result in different tuning states of the antenna tuner 215 of FIG. 2 or the antenna tuner 315 of FIG. 3. A column 904 refers to a communication implementation (case), a column 906 refers to the number of communication bands, abbreviated CA bands for carrier aggregation, a column 908 refers to the combination of communication bands, and a column 910 refers to the name of the communication bands. The information in columns 904, 906, 908 and 910 is similar to the information in the frequency/band combination element 600 in FIG. 6. The lookup table 900 also includes a column 912 that refers to a state (e.g., tuning state N, tuning state N+1, etc.) of the PLL-synthesizer 209 in a wireless communication device 200 and to the state of the antenna tuner 315 (FIG. 3). The tuning state shown in column 912 corresponds to the communication band or bands to which the PLL-synthesizer 209 has tuned the wireless communication device 200 to communicate over. The column 914 refers to the resonance mover state, and in particular, to the amount of off-capacitance (Coff) provided by the switch logic 335 to the electrical coupling 345, and to the antenna system 355 (FIG. 3).

The different tuning states shown in column 914 correspond to controlling the antenna tuner 315 to provide adjustable off capacitance (Coff) to the electrical coupling 345, and to the antenna system 355, resulting in the movement, or shifting, of an undesirable circuit resonance that may arise at a frequency where communication is desired or may be occurring to a frequency over which no communication is occurring.

In an exemplary embodiment, referring to FIG. 8 and in case A, communication is occurring over band 28 (LB700) and band 1 (MB2100), the wireless communication device 200 is in tuner state "N" and the circuit resonance 720 remains in the antenna response 716 (resonance mover state 1) because it is not affecting communication. Alternatively, circuit resonance 720 may be move to (state 1"), shown as circuit response 822 in FIG. 8.

In case B, communication is occurring over band 28 (LB700) and band 7 (HB2600), the wireless communication device 200 is in tuner state "N" and the circuit resonance 720 is shifted (using resonance mover state 1'), or moved, to an approximate frequency of 2.1 GHz because if left at 2.6 GHz, the circuit resonance 720 would affect communication in band 7 (HB2600). This is shown as circuit resonance 821 in FIG. 8. Alternatively, in case B, the circuit resonance 720 is shifted, or moved, to an approximate frequency of below 1.6 GHz (using resonance mover state 1"). This is shown as circuit resonance 822 in FIG. 8.

In case C, communication is occurring over band 5 (LB850) and band 1 (MB2100), the wireless communication device 200 is in tuner state "N+1" and the circuit resonance is not present. In this example, the antenna tuner 315 and switch logic 335 (FIG. 3) is set in state "N+1" while the resonance mover state of the antenna tuner 315 is off (0, not used), because communication over the band 1 (MB2100) is occurring over antenna response 818, which does not have a detrimental circuit resonance. In this example, state (N+1) of the antenna tuner 315 (FIG. 3) corresponds to communication over antenna responses 814 and 818.

In case D, communication is occurring over band 5 (LB850) and band 7 (HB2600), the wireless communication device 200 is in tuner state "N+1" and the circuit resonance is not present. In this example, state (N+1) of the antenna tuner 315 (FIG. 3) corresponds to communication over antenna responses 814 and 818, so the resonance mover state of the antenna tuner 315 may be off because no detrimental circuit resonances are present.

In case E, communication is occurring over band 1 (MB2100) and band 7 (HB2600), the wireless communication device 200 is in tuner state "N+1" and the circuit resonance is not present. In this example, state (N+1) of the antenna tuner 315 (FIG. 3) corresponds to communication over antenna responses 814 and 818, so the resonance mover state of the antenna tuner 315 may be off because no detrimental circuit resonances are present.

In case E', communication is occurring over band 1 (MB2100) and band 7 (HB2600), the wireless communication device 200 is in tuner state "N" such that communication is occurring over antenna response 816. Because antenna response 816 includes the circuit resonance 720, the circuit resonance 720 is shifted, or moved, to an approximate frequency of below 1.6 GHz. This is shown as circuit resonance 822 (resonance mover state 1") in FIG. 8.

In case F, communication is occurring over band 5 (LB850), band 1 (MB2100) and band 7 (HB2600), the wireless communication device 200 is in tuner state "N+1" and the circuit resonance is not present. In this example, state (N+1) of the antenna tuner 315 (FIG. 3) corresponds to communication over antenna responses 814 and 818, so the resonance mover state of the antenna tuner 315 may be off because no detrimental circuit resonances are present.

In case G, communication is occurring over band 28 (LB700), band 1 (MB2100) and band 7 (HB2600). In this example, state (N) of the antenna tuner 315 (FIG. 3) corresponds to communication over antenna responses 812 and 816 and the circuit resonance 720 is shifted, or moved, to an approximate frequency of below 1.6 GHz. This is shown as circuit resonance 822 resonance mover state 1" in FIG. 8.

Figure 10:
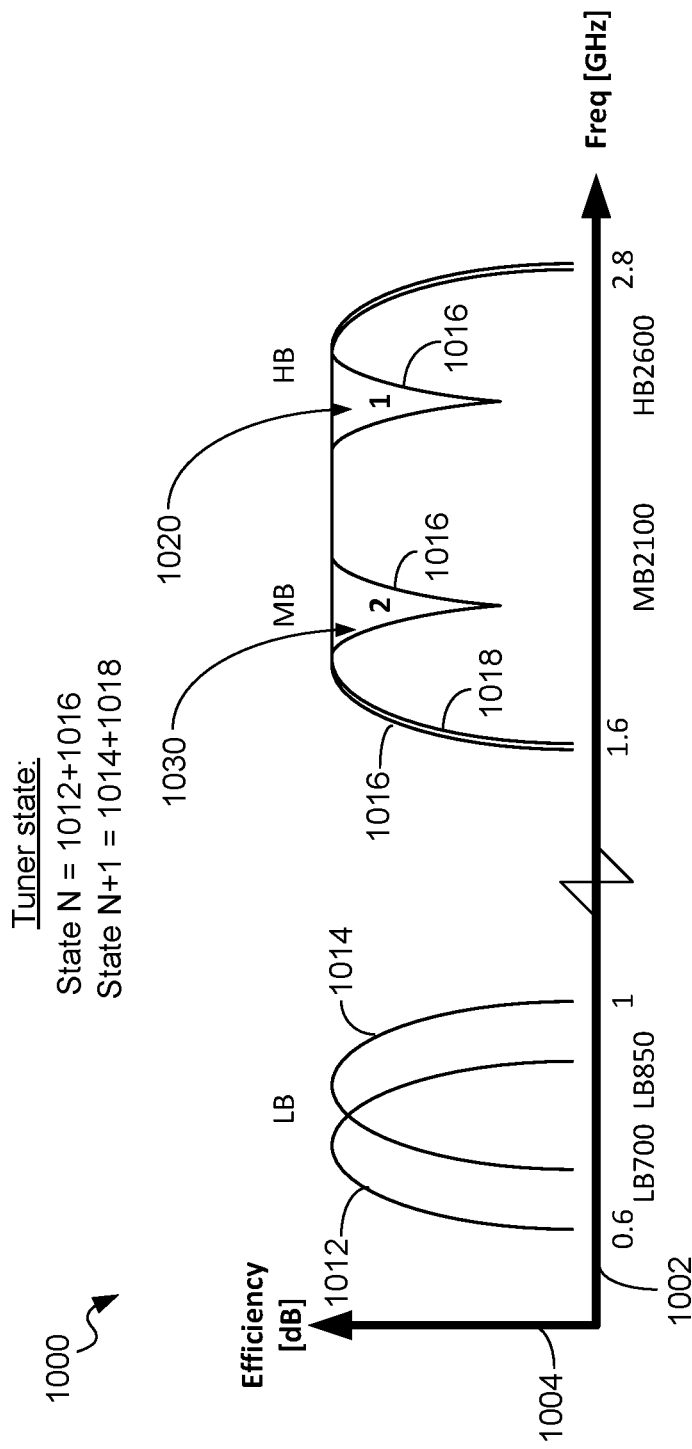
FIG. 10 is a portion of a communication spectrum showing non-ideal antenna response for at least one of a plurality of communication bands.

FIG. 10 is a portion of a communication spectrum 1000 showing non-ideal antenna response for at least one of a plurality of communication bands. The horizontal axis 1002 shows frequency (in GHz) increasing to the right and the vertical axis 1004 shows antenna efficiency (in dB) increasing upwardly. In an exemplary embodiment, the communication spectrum 1000 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 10 for example purposes only.

In FIG. 10, a sample low-band antenna response 1012 is shown with a center frequency of approximately 0.7 GHz (LB700), and a sample low-band antenna response 1014 is shown with a center frequency of approximately 0.85 GHz (LB850). Sample mid-band and high-band antenna responses 1016 and 1018 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, a first tuner state, state N, may comprise simultaneous communication on LB700 (band 28) and on MB2100 (band 1) or HB2600 (band 7) using antenna response 1012 and antenna response 1016 (which includes a circuit resonance 1020 and a circuit resonance 1030); and a second tuner state, state N+1, may comprise simultaneous communication on LB850 (band 5) and on MB2100 (band 1) or HB2600 (band 7) using antenna response 1014 and antenna response 1018 (which does not include a detrimental circuit resonance).

In an exemplary embodiment, the circuit resonance 1020 may be located at approximately 2.6 GHz, and the circuit resonance 1030 may be located at approximately 2.1 GHz, which may cause non-ideal antenna responses in both the mid-band and in the high-band, leading to a significant decrease in antenna efficiency at the affected frequencies, which in this example, are the frequencies corresponding to band 1 (MB2100) and band 7 (HB2600).

Figure 11:
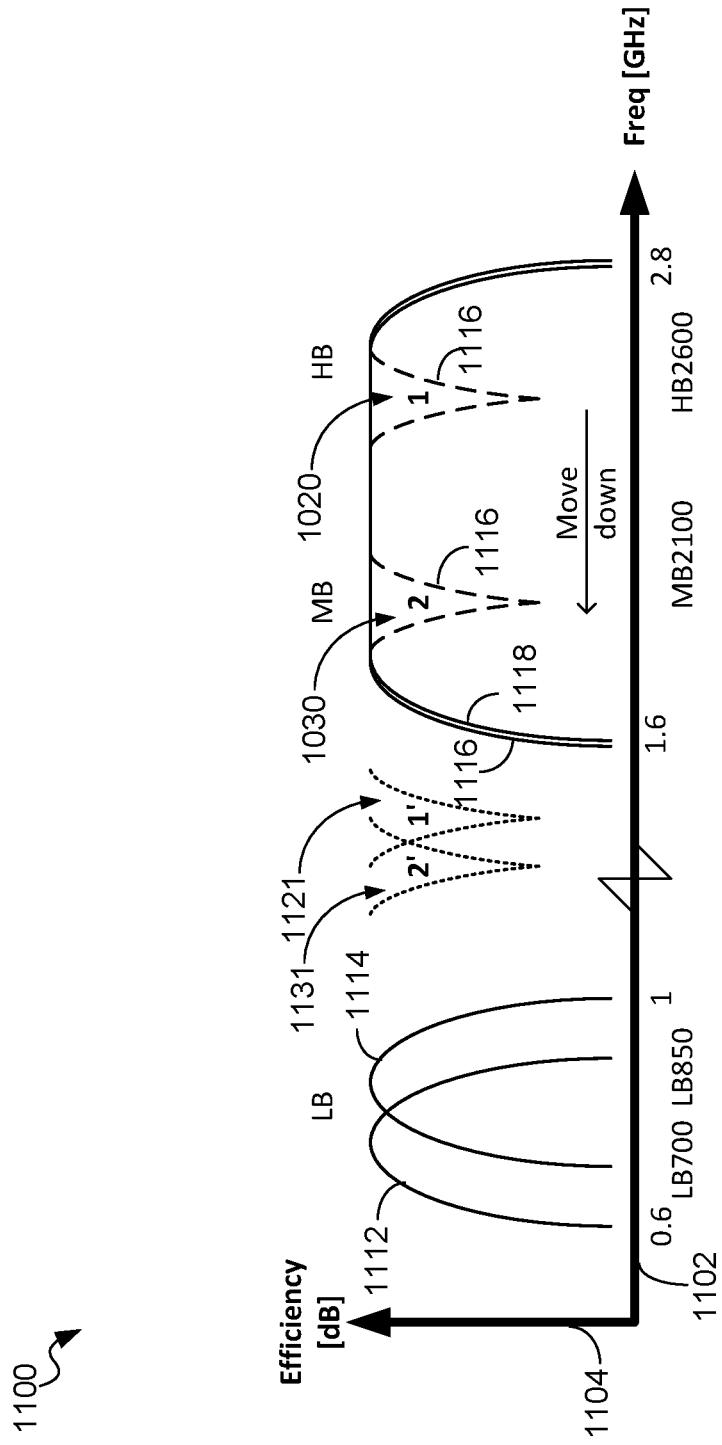
FIG. 11 is a portion of a communication spectrum showing an exemplary embodiment of shifting the circuit resonances of FIG. 10 in accordance with an exemplary embodiment of the disclosure.

FIG. 11 is a portion of a communication spectrum 1100 showing an exemplary embodiment of shifting the circuit resonances of FIG. 10 in accordance with an exemplary embodiment of the disclosure.

The horizontal axis 1102 shows frequency (in GHz) increasing to the right and the vertical axis 1104 shows antenna efficiency (in dB) increasing upwardly. In an exemplary embodiment, the communication spectrum 1100 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 11 for example purposes only.

In FIG. 11, a sample low-band antenna response 1112 is shown with a center frequency of approximately 0.7 GHz (LB700), and a sample low-band antenna response 1114 is shown with a center frequency of approximately 0.85 GHz (LB850). Sample mid-band and high-band antenna responses 1116 and 1118 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, the circuit resonance 1020 (FIG. 10) in the antenna response 1116 is shown in dotted line to indicate that the antenna tuner 315 (FIG. 3), under the control of the antenna tuner logic 330 (FIG. 3), has altered the off-capacitance of the switch logic 335, resulting in the movement of the circuit resonance 1020 away from the band of interest, which in this case is the high-band frequency of approximately 2.6 GHz. Similarly, the circuit resonance 1030 (FIG. 10) shown in the antenna response 1116 is shown in dotted line to indicate that the antenna tuner 315 (FIG. 3), under the control of the antenna tuner logic 330 (FIG. 3), has altered the off-capacitance of the switch logic 335 resulting in the movement of the circuit resonance 1030 away from the band of interest, which in this case is the mid-band frequency of approximately 2.1 GHz.

In one of the exemplary embodiments shown in FIG. 11, the circuit resonance 1020 is shifted to a lower frequency, for example, to a frequency below approximately 1.6 GHz, so it appears as circuit resonance 1121 (resonance mover state 1'). Similarly, the circuit resonance 1030 is shifted to a lower frequency, for example, to a frequency below approximately 1.6 GHz, so it appears as circuit resonance 1131 (resonance mover state 2'). Alternatively, the antenna tuner logic 330 (FIG. 3) may not shift the circuit resonances 1020 and 1030 if it is determined that the circuit resonances 1020 and 1030 will not negatively impact communication.

Figure 12:
FIG. 12 is a drawing showing an example of a lookup table of FIG. 3.

FIG. 12 is a drawing showing an example of a lookup table 1200. In an exemplary embodiment, the lookup table 1200 may be an example of the lookup table 236 of FIG. 2 or the lookup table 333 of FIG. 3. The lookup table 1200 corresponds to FIG. 11.

In an exemplary embodiment, the lookup table 1200 includes rows 1202 describing different band combinations that result in different tuning states of the antenna tuner 215 of FIG. 2 or the antenna tuner 315 of FIG. 3. A column 1204 refers to a communication implementation (case), a column 1206 refers to the number of communication bands, abbreviated CA bands for carrier aggregation, a column 1208 refers to the combination of communication bands, and a column 1210 refers to the name of the communication bands. The information in columns 1204, 1206, 1208 and 1210 is similar to the information in the frequency/band combination element 600 in FIG. 6.

The lookup table 1200 also includes a column 1212 that refers to a state (e.g., tuning state N, tuning state N+1, etc.) of the PLL-synthesizer 209 in the wireless communication device 200 and to the state of the antenna tuner 315 (FIG. 3). The tuning state shown in column 1212 corresponds to the communication band or bands to which the PLL-synthesizer 209 has tuned the wireless communication device 200 to communicate over. The column 1214 refers to the resonance mover state, and in particular, to the amount of off-capacitance (Coff) provided by the switch logic 335 to the electrical coupling 345, and to the antenna system 355 (FIG. 3).

The different tuning states shown in column 1212 correspond to controlling the switch logic 335 in the antenna tuner 315 to provide adjustable off-capacitance (Coff) to the electrical coupling 345, and to the antenna system 355, resulting in the movement, or shifting, of an undesirable circuit resonance that may arise at a frequency where communication may be desired or may be occurring to a frequency over which no communication is occurring.

In an exemplary embodiment, referring to FIG. 11 and in case A, communication is occurring over band 28 (LB700) and band 1 (MB2100), the wireless communication device 200 is in tuner state "N". In this example, the circuit resonance 1020 remains in the antenna response 1016 (resonance mover state 1) because it is not affecting communication on band 1 (MB2100) and the circuit resonance 1030 is moved to a frequency below 1.6 GHz (resonance mover state 2'), as shown in FIG. 11 as circuit resonance 1131, because circuit resonance 1030 would negatively affect communication on band 1 (MB2100). Alternatively, the circuit resonance 1020 (FIG. 11) may also be moved to a frequency below 1.6 GHz (state 1'), as shown in FIG. 11 as circuit resonance 1121.

In case B, communication is occurring over band 28 (LB700) and band 7 (HB2600), the wireless communication device 200 is in tuner state "N" and the circuit resonance 1020 is shifted, or moved, to an approximate frequency below 1.6 GHz, shown in FIG. 11 as circuit resonance 1121 (resonance mover state 1') because if left at 2.6 GHz, the circuit resonance 1020 would detrimentally affect communication on band 7 (HB2600). In case B, the circuit resonance 1030 may remain (resonance mover state 2) because it is not affecting communication on band 7 (HB2600). Alternatively, the circuit resonance 1030 (FIG. 11) may also be moved to a frequency below 1.6 GHz (state 2'), as shown in FIG. 11 as circuit resonance 1131 (resonance mover state 2').

In case C, communication is occurring over band 5 (LB850) and band 1 (MB2100), the wireless communication device 200 is in tuner state "N+1" and there is no circuit resonance with a detrimental effect present. In this example, state (N+1) of the antenna tuner 315 (FIG. 3) corresponds to communication over antenna responses 1014 and 1018, so the resonance mover state of the antenna tuner 315 may be off because no detrimental circuit resonances are present.

In case D, communication is occurring over band 5 (LB850) and band 7 (HB2600), the wireless communication device 200 is in tuner state "N+1" and there is no circuit resonance with a detrimental effect present. In this example, state (N+1) of the antenna tuner 315 (FIG. 3) corresponds to communication over antenna responses 1014 and 1018, so the resonance mover state of the antenna tuner 315 may be off because no detrimental circuit resonances are present.

In case E, communication is occurring over band 1 (MB2100) and band 7 (HB2600), the wireless communication device 200 is in tuner state "N+1" and there is no circuit resonance with a detrimental effect present. In this example, state (N+1) of the antenna tuner 315 (FIG. 3) corresponds to communication over antenna responses 1014 and 1018, so the resonance mover state of the antenna tuner 315 may be off because no detrimental circuit resonances are present.

In case E', communication is occurring over band 1 (MB2100) and band 7 (HB2600), the wireless communication device 200 is in tuner state "N" and the circuit resonance 1020 is shifted, or moved, to an approximate frequency of below 1.6 GHz and the circuit resonance 1030 is shifted, or moved, to an approximate frequency of below 1.6 GHz. This is shown as circuit resonance 1121 (resonance mover state 1') and circuit resonance 1131 (resonance mover state 2') in FIG. 11.

In case F, communication is occurring over band 5 (LB850), band 1 (MB2100) and band 7 (HB2600), the wireless communication device 200 is in tuner state "N+1" and there is no circuit resonance with a detrimental effect present. In this example, state (N+1) of the antenna tuner 315 (FIG. 3) corresponds to communication over antenna responses 1014 and 1018, so the resonance mover state of the antenna tuner 315 may be off because no detrimental circuit resonances are present.

In case G, communication is occurring over band 28 (LB700), band 1 (MB2100) and band 7 (HB2600), the wireless communication device 200 is in tuner state "N" and the circuit resonance 1020 is shifted, or moved, to an approximate frequency of below 1.6 GHz and the circuit resonance 1030 is shifted, or moved, to an approximate frequency of below 1.6 GHz. This is shown as circuit resonance 1121 (resonance mover state 1') and circuit resonance 1131 (resonance mover state 2') in FIG. 11.

Figure 13:
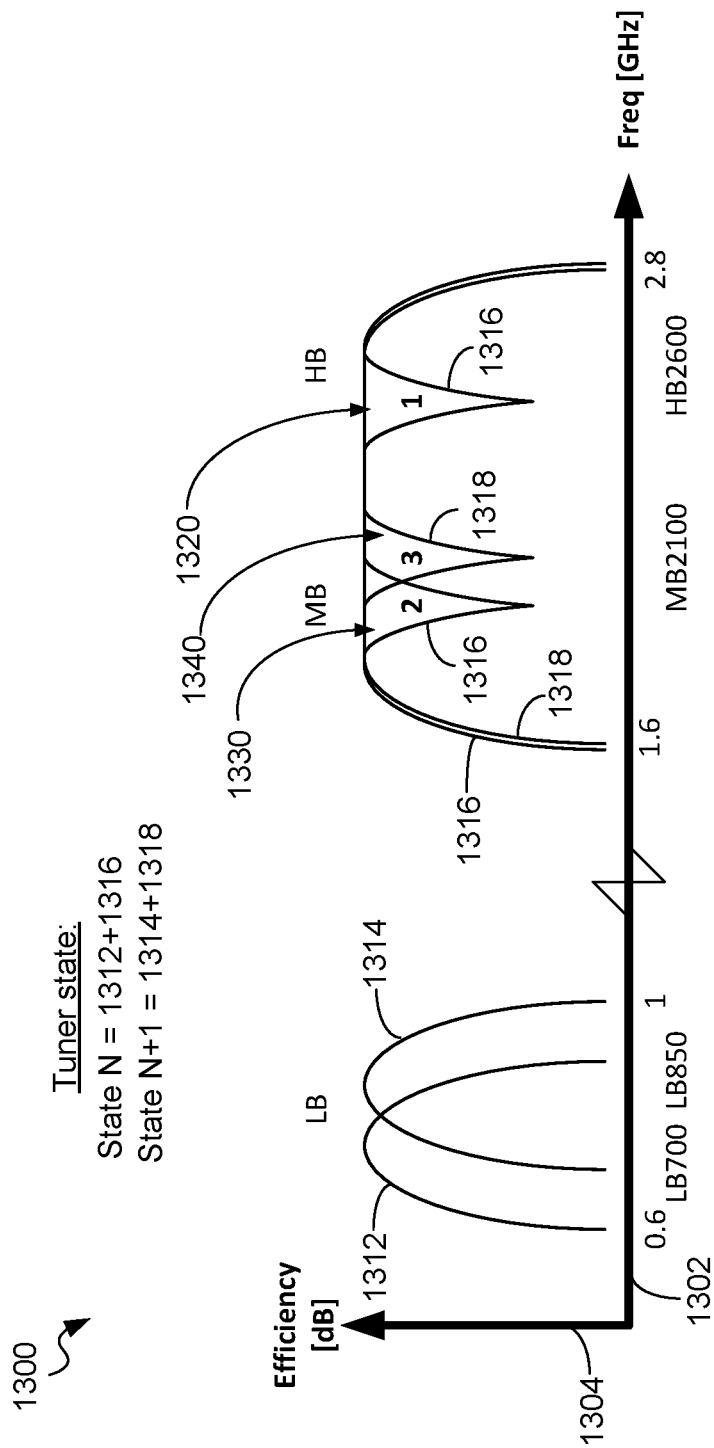
FIG. 13 is a portion of a communication spectrum showing non-ideal antenna response for at least one of a plurality of communication bands.

FIG. 13 is a portion of a communication spectrum 1300 showing non-ideal antenna response for at least one of a plurality of communication bands. The horizontal axis 1302 shows frequency (in GHz) increasing to the right and the vertical axis 1304 shows antenna efficiency (in dB) increasing upwardly. In an exemplary embodiment, the communication spectrum 1300 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 13 for example purposes only.

In FIG. 13, a sample low-band antenna response 1312 is shown with a center frequency of approximately 0.7 GHz (LB700), and a sample low-band antenna response 1314 is shown with a center frequency of approximately 0.85 GHz (LB850). Sample mid-band and high-band antenna responses 1316 and 1318 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, a first tuner state, state N, may comprise simultaneous communication on LB700 (band 28) and on MB2100 (band 1) or HB2600 (band 7) using antenna response 1312 and antenna response 1316 (which includes a circuit resonance 1320 and a circuit resonance 1330); and a second tuner state, state N+1, may comprise simultaneous communication on LB850 (band 5) and on MB2100 (band 1) or HB2600 (band 7) using antenna response 1314 and antenna response 1318 (which includes a circuit resonance 1340).

In an exemplary embodiment, the circuit resonance 1320 may be located at approximately 2.6 GHz, and the circuit resonance 1330 may be located at approximately 2.1 GHz, which may cause non-ideal antenna responses in both the mid-band and in the high-band for antenna response 1316, leading to a significant decrease in antenna efficiency at the affected frequencies, which in this example, are the frequencies corresponding to band 1 (MB2100) and band 7 (HB2600). In this exemplary embodiment, the circuit resonance 1340 may also be located at approximately 2.1 GHz (although circuit resonance 1340 is shown as being separated from circuit resonance 1330 for ease of illustration), which may cause a non-ideal antenna response in the mid-band for antenna response 1318, leading to a significant decrease in antenna efficiency at the affected frequencies, which in this example, are the frequencies corresponding to band 1 (MB2100). In this example, there are circuit resonances present in both antenna response 1316 (circuit resonances 1320 and 1330) and in antenna response 1318 (circuit resonance 1340).

Figure 14:
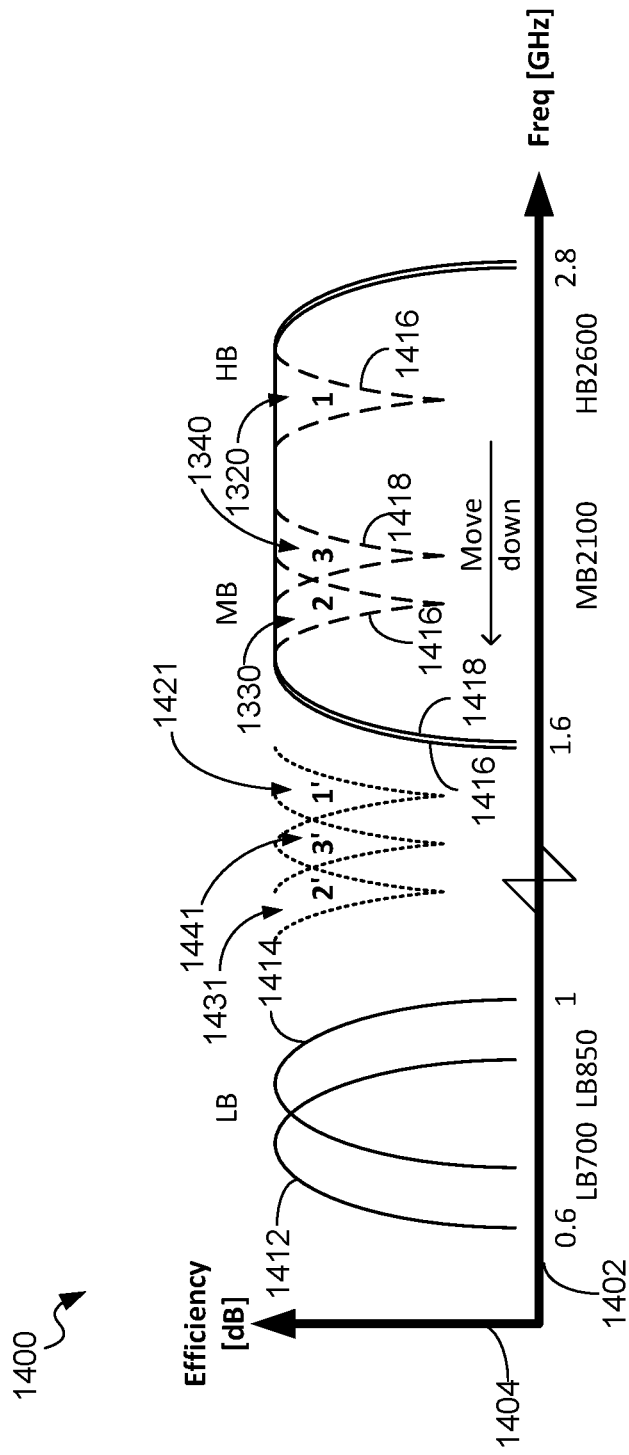
FIG. 14 is a portion of a communication spectrum showing an exemplary embodiment of shifting the circuit resonances of FIG. 13 in accordance with an exemplary embodiment of the disclosure.

FIG. 14 is a portion of a communication spectrum 1400 showing an exemplary embodiment of shifting the circuit resonances of FIG. 13 in accordance with an exemplary embodiment of the disclosure.

The horizontal axis 1402 shows frequency (in GHz) increasing to the right and the vertical axis 1404 shows antenna efficiency (in dB) increasing upwardly. In an exemplary embodiment, the communication spectrum 1400 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 14 for example purposes only.

In FIG. 14, a sample low-band antenna response 1412 is shown with a center frequency of approximately 0.7 GHz (LB700), and a sample low-band antenna response 1414 is shown with a center frequency of approximately 0.85 GHz (LB850). Sample mid-band and high-band antenna responses 1416 and 1418 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, the circuit resonance 1320 (FIG. 13) shown in the antenna response 1416 is shown in dotted line to indicate that the antenna tuner 315 (FIG. 3), under control of the antenna tuner logic 330 (FIG. 3), has adjusted the off-capacitance of the switch logic 335, resulting in the movement of the circuit resonance 1320 away from the band of interest, which in this case is the high-band frequency of approximately 2.6 GHz. Similarly, the circuit resonance 1330 (FIG. 13) shown in the antenna response 1416 is shown in dotted line to indicate that the antenna tuner 315 (FIG. 3), under control of the antenna tuner logic 330 (FIG. 3), has adjusted the off-capacitance of the switch logic 335, resulting in the movement of the circuit resonance 1330 away from the band of interest, which in this case is the mid-band frequency of approximately 2.1 GHz.

Similarly, the circuit resonance 1340 (FIG. 13) shown in the antenna response 1418 is shown in dotted line to indicate that the antenna tuner 315 (FIG. 3), under control of the antenna tuner logic 330 (FIG. 3), has adjusted the off-capacitance of the switch logic 335, resulting in the movement of the circuit resonance 1340 away from the band of interest, which in this case is the mid-band frequency of approximately 2.1 GHz.

In one of the exemplary embodiments shown in FIG. 14, the circuit resonance 1320 is shifted to a lower frequency, for example, to a frequency below approximately 1.6 GHz, so it appears as circuit resonance 1421 (resonance mover state 1'). Similarly, the circuit resonance 1330 is shifted to a lower frequency, for example, to a frequency below approximately 1.6 GHz, so it appears as circuit resonance 1431 (resonance mover state 2') and the circuit resonance 1340 is shifted to a lower frequency, for example, to a frequency below approximately 1.6 GHz, so it appears as circuit resonance 1441 (resonance mover state 3').

Alternatively, the antenna tuner logic 330 (FIG. 3, under control of the antenna tuner logic 330 (FIG. 3), may not shift the circuit resonances 1320, 1330 and 1340 if it is determined that the circuit resonances 1320, 1330 and 1340 will not negatively impact communication.

FIG. 15 is a drawing showing an example of a lookup table 1500. In an exemplary embodiment, the lookup table 1500 may be an example of the lookup table 236 of FIG. 2 or the lookup table 333 of FIG. 3. The lookup table 1500 corresponds to FIG. 14.

In an exemplary embodiment, the lookup table 1500 includes rows 1502 describing different band combinations that result in different tuning states of the antenna tuner 215 of FIG. 2 or the antenna tuner 315 of FIG. 3. A column 1504 refers to a communication implementation (case), a column 1506 refers to the number of communication bands, abbreviated CA bands for carrier aggregation, a column 1508 refers to the combination of communication bands, and a column 1510 refers to the name of the communication bands. The information in columns 1504, 1506, 1508 and 1510 is similar to the information in the frequency/band combination element 600 in FIG. 6.

The lookup table 1500 also includes a column 1512 that refers to a state (e.g., tuning state N, tuning state N+1, etc.) of the PLL-synthesizer 209 in the wireless communication device 200 and to the state of the antenna tuner 315 (FIG. 3). The tuning state shown in column 1512 corresponds to the communication band or bands to which the PLL-synthesizer 209 has tuned the wireless communication device to communicate over. The column 1514 refers to the resonance mover state, and in particular, to the amount of off-capacitance (Coff) provided by the switch logic 335 to the electrical coupling 345, and to the antenna system 355 (FIG. 3).

The different tuning states shown in column 1512 correspond to controlling the switch logic 335 in the antenna tuner 315 to provide adjustable off-capacitance (Coff) to the electrical coupling 345, and to the antenna system 355 (FIG. 3), resulting in the movement, or shifting, of an undesirable circuit resonance that may arise at a frequency where communication may be desired or may be occurring to a frequency over which no communication is occurring.

In an exemplary embodiment, referring to FIG. 14 and in case A, communication is occurring over band 28 (LB700) and band 1 (MB2100), the wireless communication device 200 is in tuner state "N" such that the antenna response 1412 and the antenna response 1416 are of interest. In this example, the circuit resonance 1320 remains (state 1) because it is not affecting communication on band 1 (MB2100) and the circuit resonance 1330 is moved to a frequency below 1.6 GHz (resonance mover state 2'), as shown in FIG. 14 as circuit resonance 1431, because circuit resonance 1330 would negatively affect communication on band 1 (MB2100). Alternatively, the circuit resonance 1320 (FIG. 14) may also be moved to a frequency below 1.6 GHz (resonance mover state 1'), as shown in FIG. 14 as circuit resonance 1421.

In case B, communication is occurring over band 28 (LB700) and band 7 (HB2600), the wireless communication device 200 is in tuner state "N" such that the antenna response 1412 and the antenna response 1416 are of interest. In this example, the circuit resonance 1320 is shifted, or moved, to an approximate frequency below 1.6 GHz, shown in FIG. 14 as circuit resonance 1421 (resonance mover state 1') because if left at 2.6 GHz, the circuit resonance 1320 would detrimentally affect communication. In case B, the circuit resonance 1330 may remain (resonance mover state 2) because it is not detrimentally affecting communication on band 7 (HB2600). Alternatively, the circuit resonance 1330 (FIG. 14) may also be moved to a frequency below 1.6 GHz (resonance mover state 2'), as shown in FIG. 14 as circuit resonance 1431.

In case C, communication is occurring over band 5 (LB850) and band 1 (MB2100), the wireless communication device 200 is in tuner state "N+1" such that the antenna response 1414 and the antenna response 1418 are of interest. In this example, the circuit resonance 1340 may be shifted, or moved, to a frequency lower than 1.6 GHz (resonance mover state 3'), as shown in FIG. 14 as circuit response 1441.

In case D, communication is occurring over band 5 (LB850) and band 7 (HB2600), the wireless communication device 200 is in tuner state "N+1" such that the antenna response 1414 and the antenna response 1418 are of interest. In this example, the circuit resonance 1340 may be shifted, or moved, to a frequency lower than 1.6 GHz (resonance mover state 3'), as shown in FIG. 14 as circuit response 1441. Alternatively, the circuit resonance 1340 may remain (resonance mover state 3) if it is sufficiently removed in frequency from band 7 (HB2600) so as to not detrimentally affect communication on band 7 (HB2600).

In case E, communication is occurring over band 1 (MB2100) and band 7 (HB2600), the wireless communication device 200 is in tuner state "N+1" such that the antenna response 1414 and the antenna response 1418 are of interest. In this example, the circuit resonance 1340 may be shifted, or moved, to a frequency lower than 1.6 GHz (resonance mover state 3'), as shown in FIG. 14 as circuit response 1441.

In case E', communication is occurring over band 1 (MB2100) and band 7 (HB2600), the wireless communication device 200 is in tuner state "N" such that the antenna response 1412 and the antenna response 1416 are of interest. In this example, the circuit resonance 1320 is shifted, or moved, to an approximate frequency of below 1.6 GHz and the circuit resonance 1330 is shifted, or moved, to an approximate frequency of below 1.6 GHz. This is shown as circuit resonance 1421 (resonance mover state 1') and circuit resonance 1431 (resonance mover state 2') in FIG. 14. In this example, the circuit resonance 1340 is not present in tuner state N.

In case F, communication is occurring over band 5 (LB850), band 1 (MB2100) and band 7 (HB2600), the wireless communication device 200 is in tuner state "N+1" such that the antenna response 1414 and the antenna response 1418 are of interest. In this example, the circuit resonance 1340 may be shifted, or moved, to a frequency lower than 1.6 GHz (resonance mover state 3'), as shown in FIG. 14 as circuit response 1441.

In case G, communication is occurring over band 28 (LB700), band 1 (MB2100) and band 7 (HB2600), the wireless communication device 200 is in tuner state "N" such that the antenna response 1412 and the antenna response 1416 are of interest. In this example, the circuit resonance 1320 is shifted, or moved, to an approximate frequency of below 1.6 GHz and the circuit resonance 1330 is shifted, or moved, to an approximate frequency of below 1.6 GHz. This is shown as circuit resonance 1421 (resonance mover state 1') and circuit resonance 1431 (resonance mover state 2') in FIG. 14. In this example, the circuit resonance 1340 is not present in tuner state N.

Figure 16:
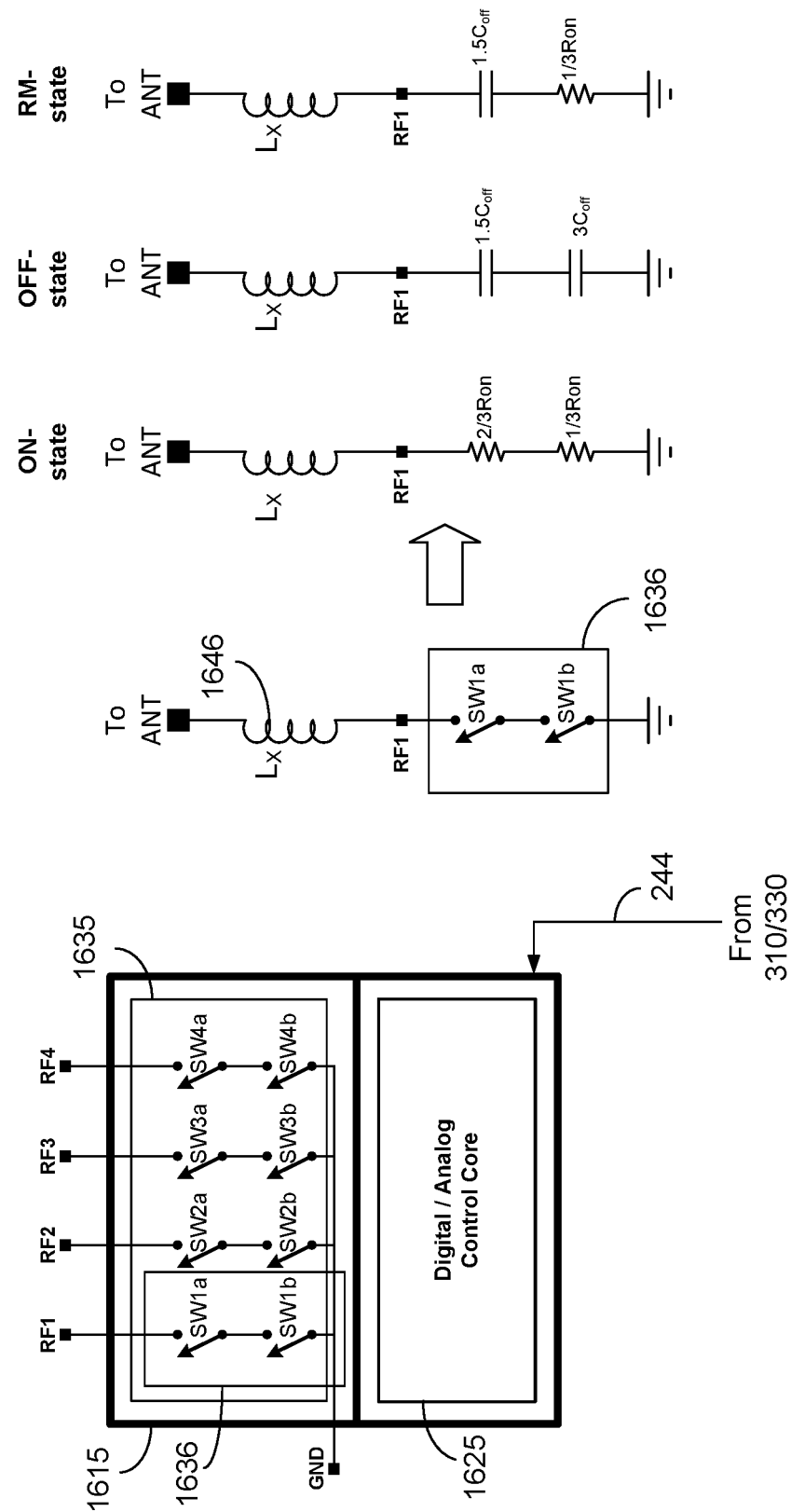
FIG. 16 is a block diagram showing a more detailed view of the antenna tuner of FIG. 3.

FIG. 16 is a block diagram showing a more detailed view of the antenna tuner of FIG. 3. Elements in FIG. 16 that are similar to corresponding elements in FIG. 3 will be labeled using the nomenclature 16XX, where an element in FIG. 16 labeled 16XX is similar to an element in FIG. 3 labeled 3XX. For example, the antenna tuner 1615 in FIG. 16 is similar to, and is an exemplary embodiment of the antenna tuner 315 in FIG. 3.

In an exemplary embodiment, an antenna tuner 1615 may comprise a control core 1625 coupled to a switch logic 1635. The inductive coupling that couples the switch logic 1635 to the antenna array is omitted from FIG. 16 for ease of illustration. However, an instance of the inductive coupling 1646 is shown between an antenna port (To ANT) and the switch path 1636.

In an exemplary embodiment, the switch logic 1635 is illustrated using separate switches in separate switch paths for each RF path, with an exemplary switch path being shown using reference numeral 1636. In the example shown in FIG. 16, the variable capacitance (336 in FIG. 3) is illustrated as two switches, SW1a and SW1b, which may be implemented using, for example, one or more field effect transistors (FETs) configured in a stack arrangement. The switches SW2a and SW2b, SW3a and SW3b, and SW4a and SW4b are also shown, but not individually described, as they are similar to the switch path 1636. Each FET has an off-capacitance value, and a combination of a plurality of FET switches may be implemented to develop a range of off-capacitance values for each switch path, thus making each switch path capable of providing a variable off-capacitance.

In an exemplary embodiment, the switches SW1a and SW1b (and the other switches shown), may be configured to provide a variable, or tunable, off-capacitance, Coff, between a respective RF terminal (RF1, RF2, RF3 and RF4) and system ground, thereby tuning the antenna response (also referred to as antenna aperture tuning) of the antenna 202 (FIG. 2), based on control signals provided by the antenna tuner logic 330 (FIG. 3), as described above.

In an exemplary embodiment, in an on state, the switches SW1a and SW1b in the switch path 1636 are conductive, and exhibit an on resistance, Ron, where in an exemplary embodiment SW1a comprises ⅔Ron and SW1b comprises ⅓Ron.

In an exemplary embodiment, in an off state, the switches SW1a and SW1b in the switch path 1636 are non-conductive, and exhibit an off capacitance, Coff, where SW1a comprises an exemplary off-capacitance of 1.5Coff and SW1b comprises an exemplary off-capacitance of 3Coff. The values of off-capacitance for the switches SW1a and SW1b are given as examples only.

In an exemplary embodiment, in a resonance mover (RM) state, the switch SW1a is non-conductive, and exhibits an exemplary off-capacitance, Coff, of 1.5Coff and the switch SW1b is conductive and comprises an exemplary on resistance, Ron, of ⅓Ron.

In this manner, the off-capacitance, Coff, of the switch path 1636 may be variable, and adjustable, based on the presence of a circuit resonance and a desired antenna response.

Figure 17:
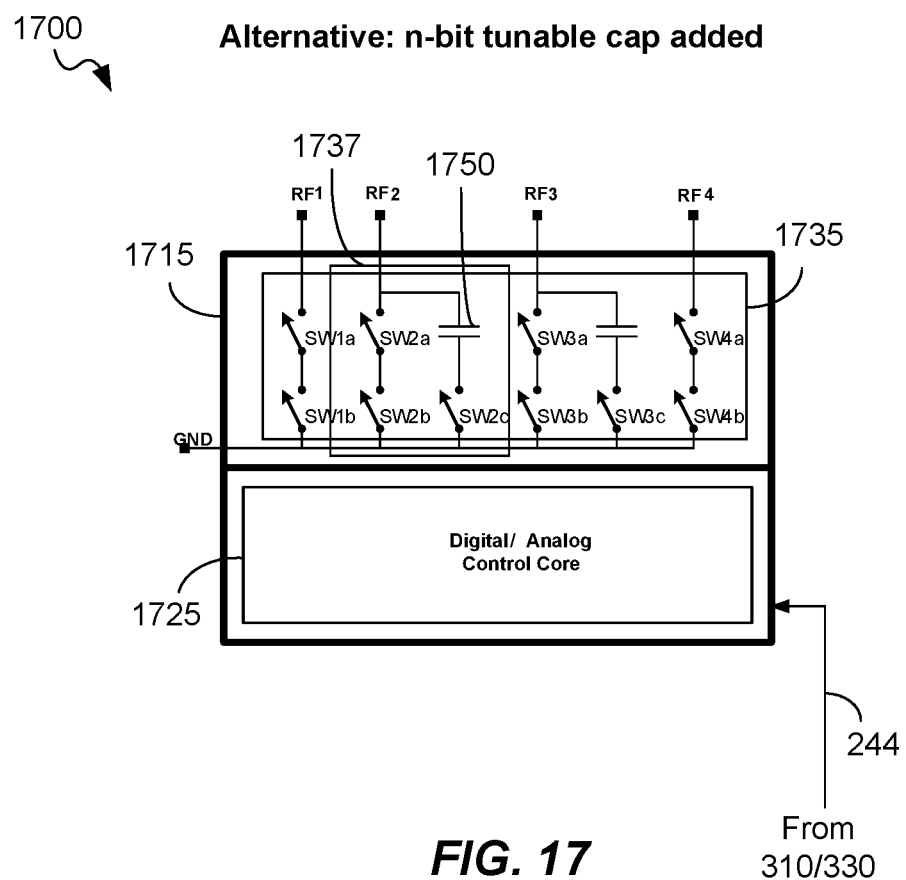
FIG. 17 is a block diagram showing an alternative exemplary embodiment of the switch logic in the antenna tuner of FIG. 3.

FIG. 17 is a block diagram showing an alternative exemplary embodiment of the switch logic 335 in the antenna tuner 315 of FIG. 3. Elements in FIG. 17 that are similar to corresponding elements in FIG. 3 and FIG. 16 will be labeled using the nomenclature 17XX, where an element in FIG. 17 labeled 17XX is similar to an element in FIG. 3 labeled 3XX and an element in FIG. 16 labeled 16XX. For example, the antenna tuner 1715 in FIG. 17 is similar to, and is an exemplary embodiment of the antenna tuner 315 in FIG. 3 and the antenna tuner 1615 in FIG. 16.

In an exemplary embodiment, an antenna tuner 1715 may comprise a control core 1725 coupled to a switch logic 1735.

The inductive coupling that couples the switch logic 1735 to the antenna array is omitted from FIG. 17 for ease of illustration.

In an exemplary embodiment, the switch logic 1735 is illustrated using separate switches in separate switch paths for each RF path (RF1, RF2, RF3 and RF4), with an exemplary switch path being shown using reference numeral 1737. In the example shown in FIG. 17, the variable capacitance (337 in FIG. 3) is illustrated as three switches, SW2a, SW2b, and SW2c, where the switch path 1737 also includes a capacitance 1750 switchably coupled to system ground by switch SW2c.

Similar to the switch path 1636 in FIG. 16, the switch path 1737 may be implemented using, for example, one or more field effect transistors (FETs) configured in a stack arrangement. The switches SW1a and SW1b, and SW4a and SW4b may not include a capacitance (and be similar to switch path 1636 shown in FIG. 16), but the switches SW3a, SW3b and SW3c, may be implemented similarly to the switches in the switch path 1737.

In an exemplary embodiment, the capacitor 1750 may be part of an n-bit tunable circuit configured to further control the off-capacitance, Coff, provided by the switch path 1737.

Figure 18:
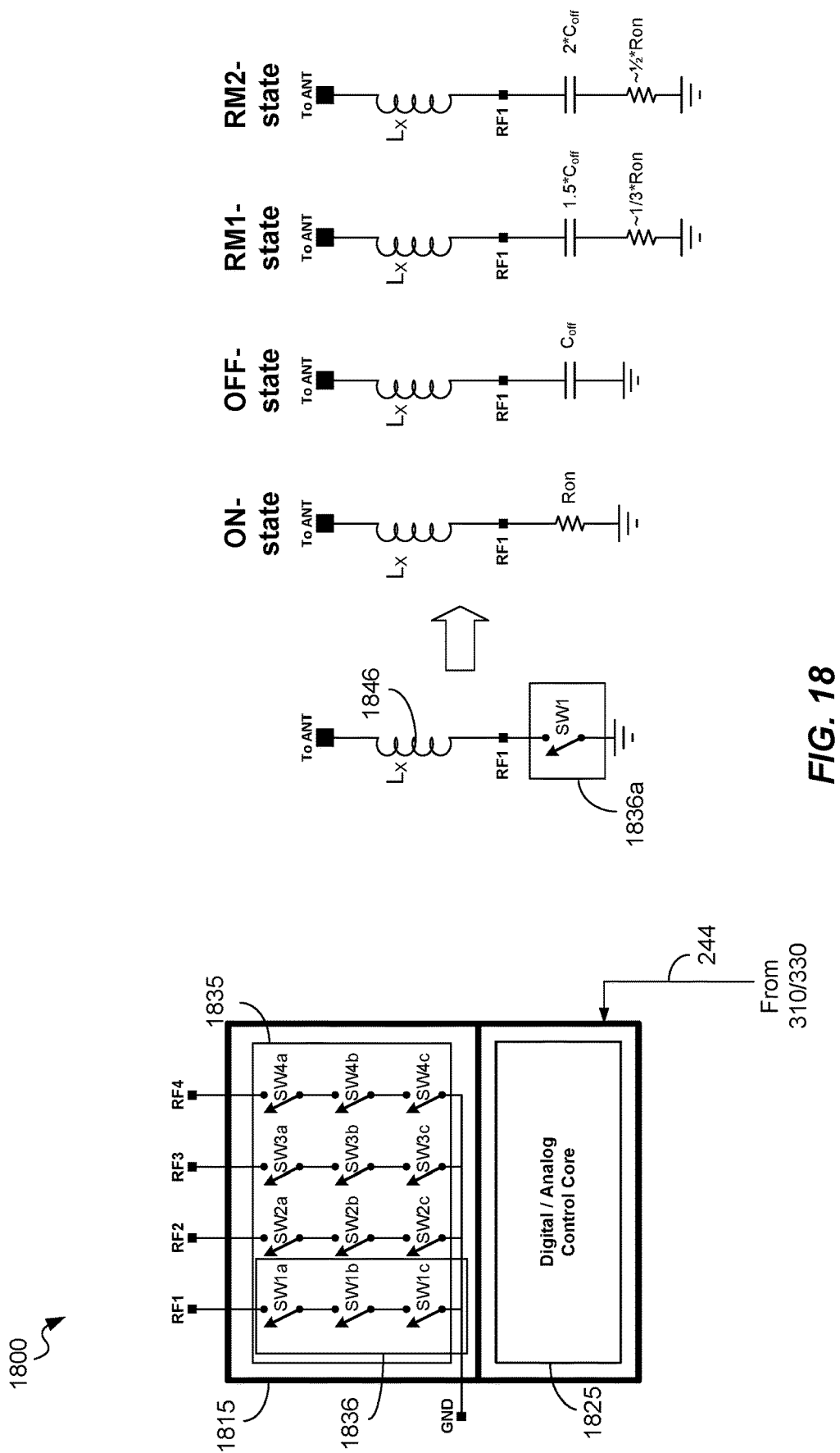
FIG. 18 is a block diagram showing a more detailed view of the antenna tuner of FIG. 3.

FIG. 18 is a block diagram showing a more detailed view of the antenna tuner of FIG. 3. Elements in FIG. 18 that are similar to corresponding elements in FIG. 3 will be labeled using the nomenclature 16XX, where an element in FIG. 18 labeled 18XX is similar to an element in FIG. 3 labeled 3XX. For example, the antenna tuner 1815 in FIG. 18 is similar to, and is an exemplary embodiment of the antenna tuner 315 in FIG. 3.

In an exemplary embodiment, an antenna tuner 1815 may comprise a control core 1825 coupled to a switch logic 1835. An exemplary switch path 1836 is shown having three switches, SW1a, SW1b and SW1c. The inductive coupling that couples the switch logic 1835 to the antenna array is omitted for ease of illustration. However, an instance of the inductive coupling 1846 is shown between an antenna port (To ANT) and the switch path 1836, which is shown as a single switch, SW1 (1836a), for ease of illustration.

In an exemplary embodiment, the switch logic 1835 is illustrated using separate switches in separate switch paths for each RF path, with an exemplary switch path being shown using reference numeral 1836. In the example shown in FIG. 18, the variable capacitance (336 in FIG. 3) is illustrated as three switches, SW1a, SW1b and SW1c, which may be implemented using, for example, three field effect transistors (FETs) configured in a stack arrangement. The switches SW2a, SW2b and SW2c, SW3a, SW3b and SW3c, and SW4a, SW4b and SW4c are also shown, but not individually described.

In an exemplary embodiment, the switches SW1a, SW1b and SW1c (and the other switches shown), may be configured to provide a variable, or tunable, off-capacitance, Coff, between a respective RF terminal (RF1, RF2, RF3 and RF4) and system ground, thereby tuning the antenna response of the antenna 202 (FIG. 2), based on control signals provided by the antenna tuner logic 330 (FIG. 3), as described above.

The exemplary embodiment shown in FIG. 18 shows a tradeoff between voltage handling capability and off-capacitance, Coff, of each switch path. In an exemplary embodiment, in an on state, the switches SW1a, SW1b and SW1c (shown collectively as switch 1836a (SW1)) are conductive, and exhibit an on resistance, Ron.

In an exemplary embodiment, in an off state, the switches SW1a, SW1b and SW1c (shown collectively as switch 1836a (SW1)) are non-conductive, and exhibit an off capacitance, Coff.

In an exemplary embodiment, in a first resonance mover (RM1) state, the switch SW1a may be OFF, the switch SW1b may be OFF and the switch SW1c may be ON and may be configured to exhibit an off capacitance, Coff, of 1.5*Coff and an on resistance, Ron, of ⅓*Ron. Alternatively, any one of the switches SW1a, SW1b or SW1c may be ON while the other switches are OFF.

In an exemplary embodiment, in a second resonance mover (RM2) state, the switch SW1a may be OFF, the switch SW1b may be ON and the switch SW1c may be ON and may be configured to exhibit an off capacitance, Coff, of 2*Coff and an on resistance, Ron, of ½*Ron. Alternatively, any two of the switches SW1a, SW1b or SW1c may be OFF while the other switch is ON.

Figure 19:
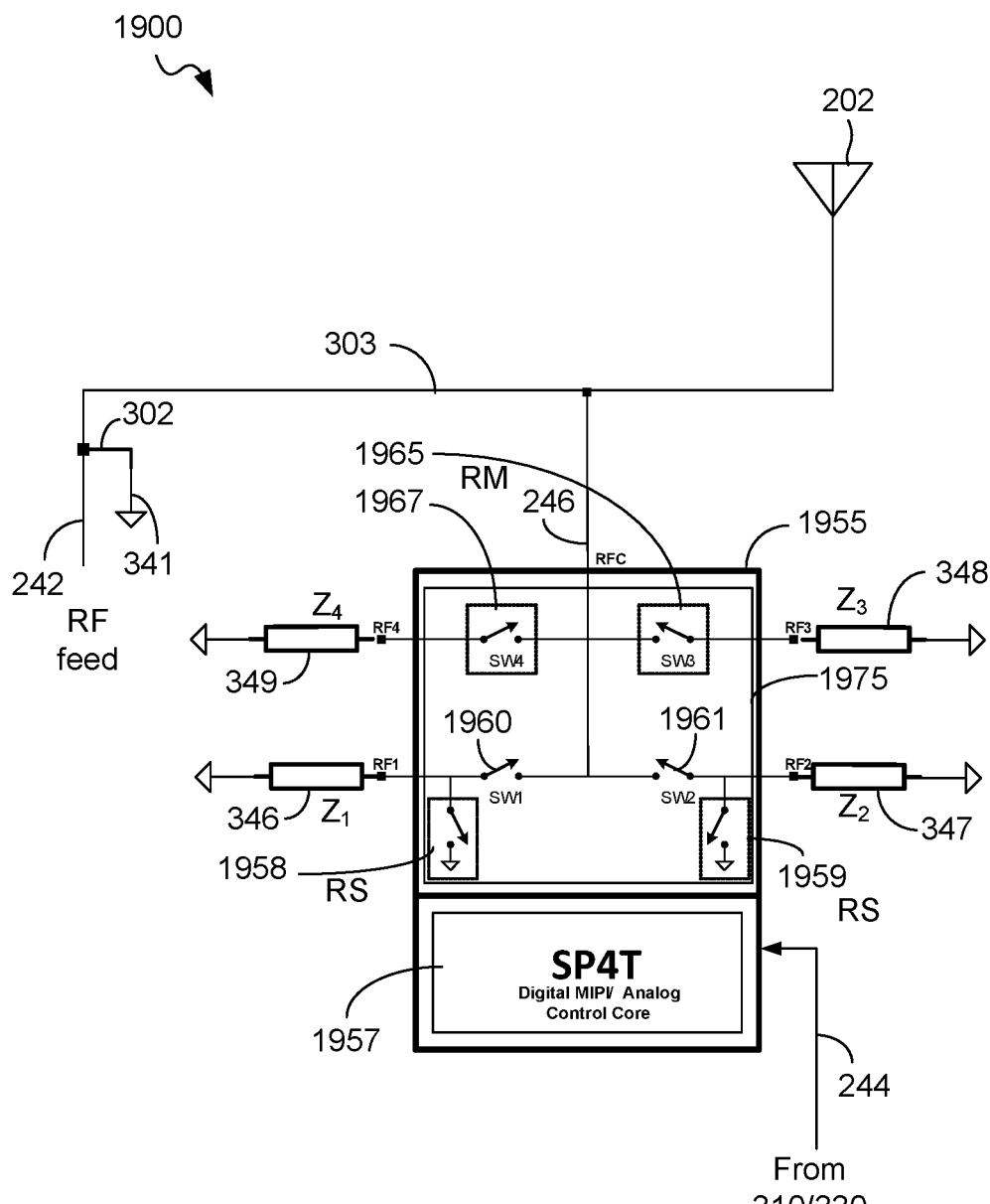
FIG. 19 is a block diagram showing an alternative exemplary embodiment of an antenna tuner.

FIG. 19 is a block diagram showing an alternative exemplary embodiment of an antenna tuner. In an exemplary embodiment, an antenna tuner 1955 may comprise a control core 1957 coupled to a switch logic 1975. The switch logic 1975 is coupled to the antenna aperture port over connection 246. In an exemplary embodiment, the inductive couplings 346, 347, 348 and 349 couple respective RF ports RF1, RF2, RF3 and RF4 to system ground.

In an exemplary embodiment, the switch logic 1975 comprises resonance stopper switches 1958 and 1959; and resonance mover switches 1965 and 1967. The resonance stopper switches are configured to completely eliminate a resonance. The resonance mover switches 1965 and 1967 are configured to shift a resonance, as described herein.

Figure 20:
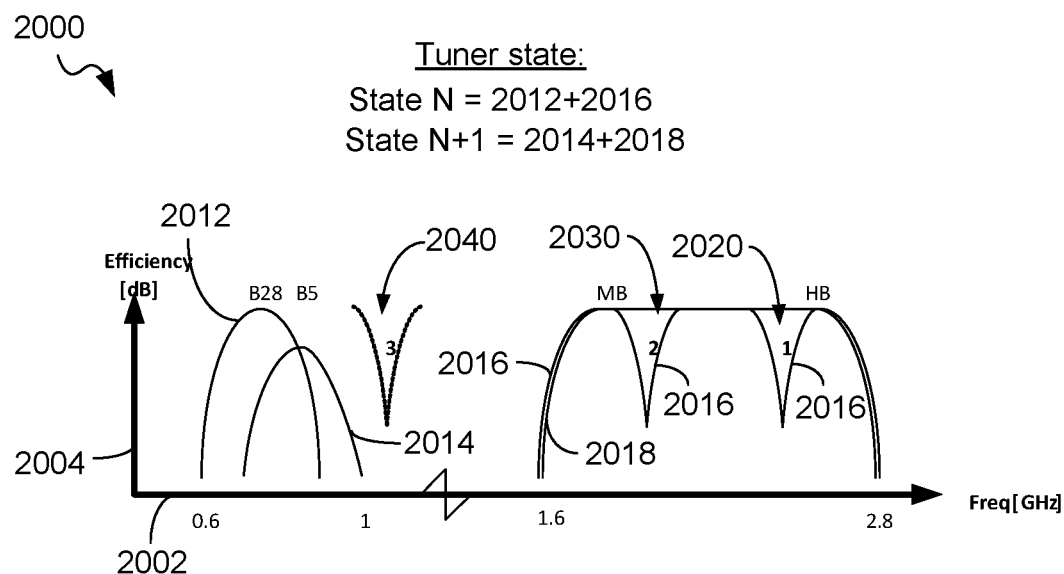
FIG. 20 is a portion of a communication spectrum showing non-ideal antenna response for at least one of a plurality of communication bands.

FIG. 20 is a portion of a communication spectrum 2000 showing non-ideal antenna response for at least one of a plurality of communication bands. The horizontal axis 2002 shows frequency (in GHz) increasing to the right and the vertical axis 2004 shows antenna efficiency (in dB) increasing upwardly. In an exemplary embodiment, the communication spectrum 2000 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 20 for example purposes only.

In FIG. 20, a sample low-band antenna response 2012 is shown with a center frequency of approximately 0.7 GHz (LB700), and a sample low-band antenna response 2014 is shown with a center frequency of approximately 0.85 GHz (LB850). Sample mid-band and high-band antenna responses 2016 and 2018 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, a first tuner state, state N, may comprise simultaneous communication on LB700 (band 28) and on MB2100 (band 1) or HB2600 (band 7) using antenna response 2012 and antenna response 2016, which includes a circuit resonance 2020 and a circuit resonance 2030; and a second tuner state, state N+1, may comprise simultaneous communication on LB850 (band 5) and on MB2100 (band 1) or HB2600 (band 7) using antenna response 2014 and antenna response 2018 (which does not include a circuit resonance in the mid-band or high-band). However, in this example, the antenna response 2014 is compromised by a circuit resonance 2040.

In an exemplary embodiment, the circuit resonance 2020 may be located at approximately 2.6 GHz, and the circuit resonance 2030 may be located at approximately 2.1 GHz, which may cause non-ideal antenna responses in both the mid-band and in the high-band, leading to a significant decrease in antenna efficiency at the affected frequencies, which in this example, are the frequencies corresponding to band 1 (MB2100) and band 7 (HB2600) when antenna response 2016 is used. Further, in an exemplary embodiment, the circuit resonance 2040 may be located close to the low-band (between for example, 1 GHz and 1.6 GHz), such that it negatively affects the antenna response 2014.

Figure 21:
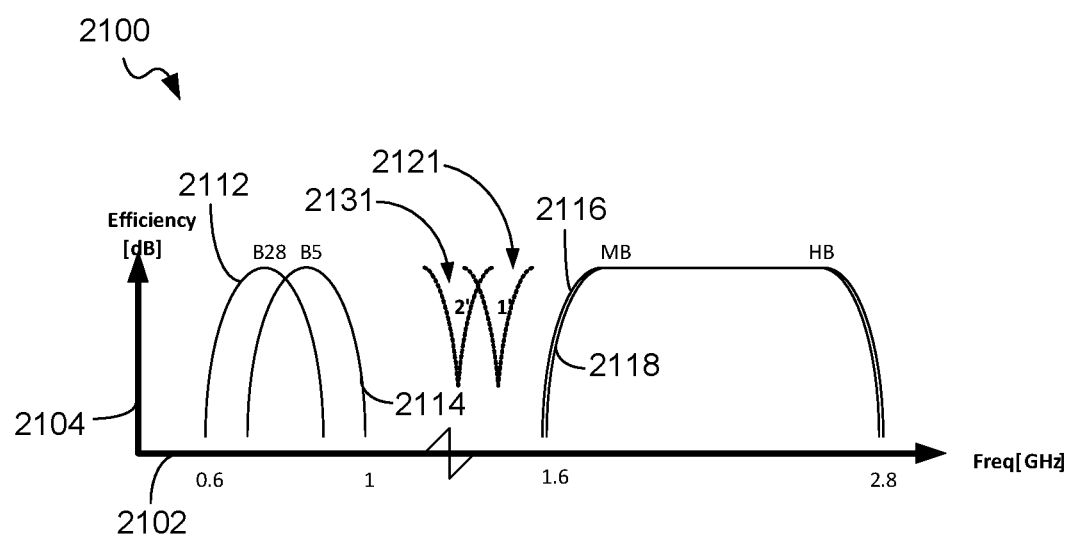
FIG. 21 is a portion of a communication spectrum showing an exemplary embodiment of removing the circuit resonance of FIG. 20, and shifting the circuit resonances and of FIG. 20 in accordance with an exemplary embodiment of the disclosure.

FIG. 21 is a portion of a communication spectrum 2100 showing an exemplary embodiment of removing the circuit resonance 2040 of FIG. 20, and shifting the circuit resonances 2020 and 2030 of FIG. 20 in accordance with an exemplary embodiment of the disclosure.

The horizontal axis 2102 shows frequency (in GHz) increasing to the right and the vertical axis 2104 shows antenna efficiency (in dB) increasing upwardly. In an exemplary embodiment, the communication spectrum 2100 shows a low-band (LB) region in the approximate frequency range of 0.6 to 1.0 GHz, and shows a mid-band (MB) and high-band (HB) region in the approximate frequency range of 1.6 to 2.8 GHz. Other frequencies and frequency bands are possible with those shown in FIG. 21 for example purposes only.

In FIG. 21, a sample low-band antenna response 2112 is shown with a center frequency of approximately 0.7 GHz (LB700), and a sample low-band antenna response 2114 is shown with a center frequency of approximately 0.85 GHz (LB850). Sample mid-band and high-band antenna responses 2116 and 2118 are shown spanning a frequency range of approximately 1.6 GHz to approximately 2.8 GHz, with a mid-band frequency of approximately 2.1 GHz (MB2100) and a high-band frequency of approximately 2.6 GHz (HB2600).

In an exemplary embodiment, the circuit resonance 2020 (FIG. 20) shown in the antenna response 2016 is shown in dotted line as circuit resonance 2121 to indicate that the antenna tuner 1955 (FIG. 19) has shifted the circuit resonance 2020 away from 2.6 GHz, resulting in the movement of the circuit resonance 2020 away from the band of interest, which in this case is the high-band frequency of approximately 2.6 GHz. Similarly, the circuit resonance 2030 (FIG. 20) shown in the antenna response 2016 is shown in dotted line as circuit resonance 2131 to indicate that the antenna tuner 1955 (FIG. 19) has shifted the circuit resonance 2030 away from 2.1 GHz, resulting in the movement of the circuit resonance 2030 away from the band of interest, which in this case is the mid-band frequency of approximately 2.1 GHz.

In one of the exemplary embodiments shown in FIG. 21, the circuit resonance 2020 is shifted to a lower frequency, for example, to a frequency below approximately 1.6 GHz, so it appears as circuit resonance 2121 (resonance mover state 1'). Similarly, the circuit resonance 2030 is shifted to a lower frequency, for example, to a frequency below approximately 1.6 GHz, so it appears as circuit resonance 2131 (resonance mover state 2').

In this exemplary embodiment, one or more of the resonance stopper (RS) switches 1958 or 1959 of FIG. 19 has eliminated the circuit resonance 2040 (FIG. 20), such that the antenna response 2114 is no longer compromised. Resonance stopper switches 1958 and 1959 may be controlled using logic that is complementary to the logic that controls the switches 1960 (SW1) and 1962 (SW2). For example, when the switch 1960 (SW1) or the switch 1961 (SW2) is made conductive (ON) the RS switch 1958 (and respectively the RS switch 1959) is made non-conductive (OFF). When the switch 1960 (SW1) or the switch 1961 is made non-conductive (OFF) the associated RS switch 1958 and RS switch 1959, respectively, is made conductive (ON). Because the RS switch 1958 (or 1959) is turned ON the external inductance to ground, which could cause a circuit resonance with OFF-state switch off-capacitance, is shorted to system ground and effectively becomes a very low inductance to ground. Effectively the use of the RS switch 1958 and the RS switch 1959 with complimentary logic to the switch 1960 (SW1) and the switch 1961 (SW2), respectively, in this example, moves the circuit resonance significantly higher in frequency and completely out of the frequency band of interest.

Figure 24:
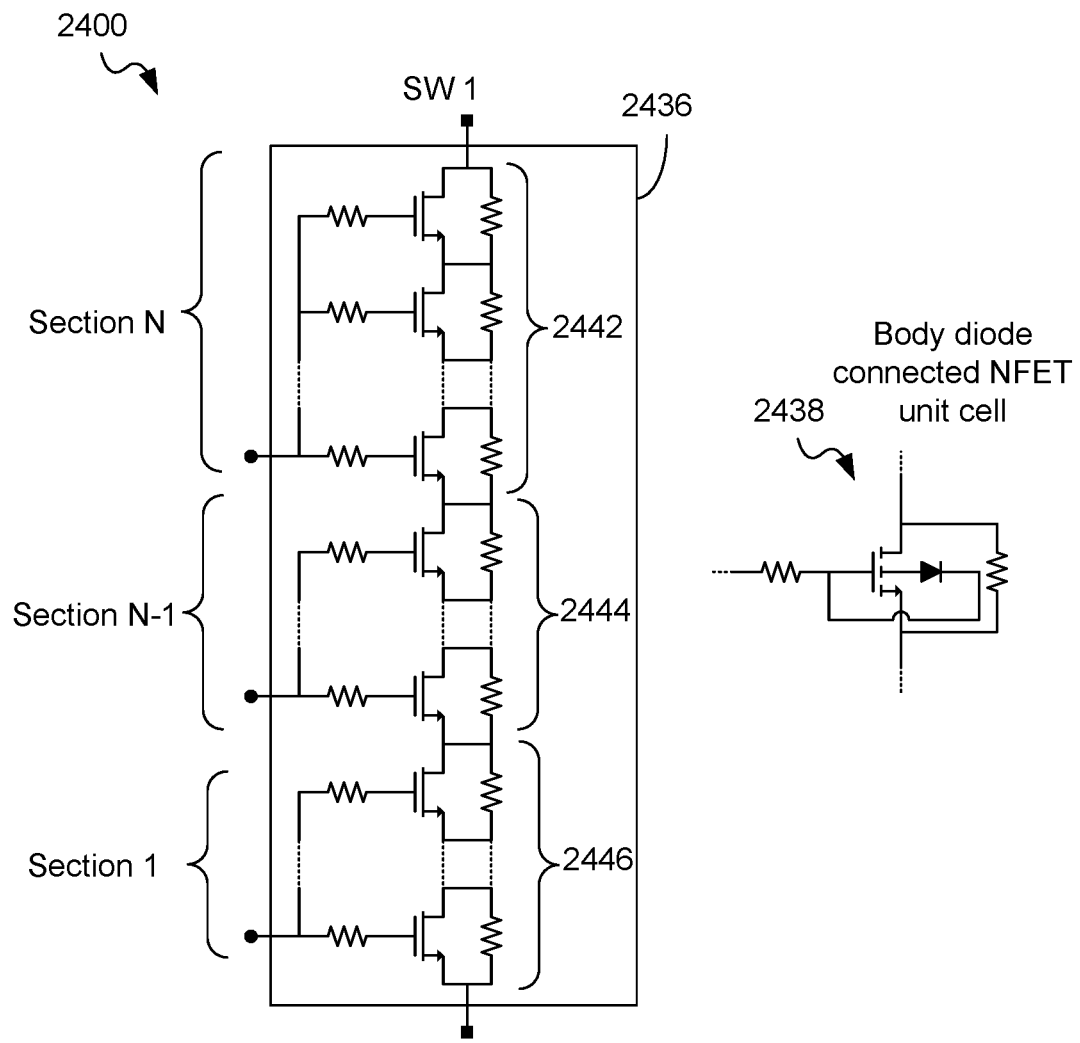
FIG. 24 is a schematic diagram showing an example of the switch path of FIG. 22.
Figure 25:
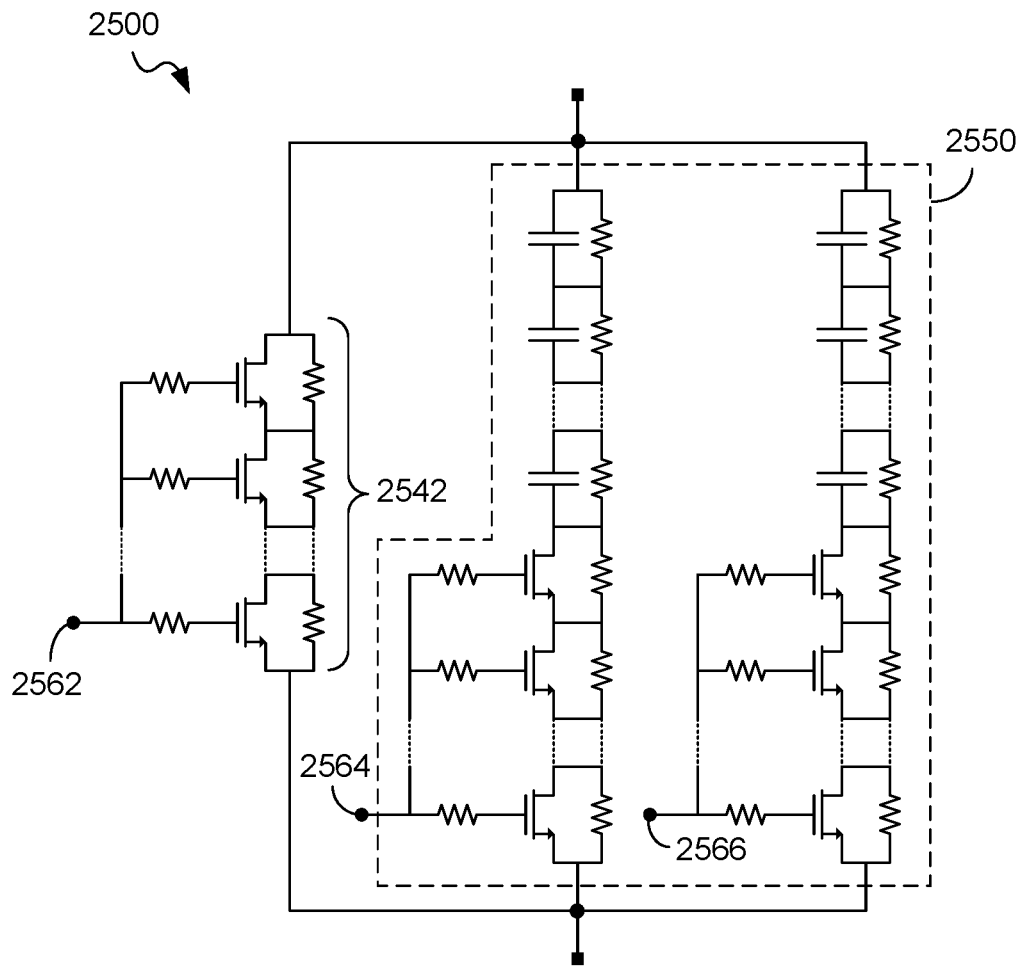
FIG. 25 is a schematic diagram showing an example of the switch path of a plurality of stacked FET devices.

In an exemplary embodiment, any or all of the switches 1960, 1961, 1965, 1967 could be configured as RM switches and/or variable capacitances. While each of the switches 1960, 1961, 1965, 1967 are illustrated as a single switch, they can be comprised of multiple sections (such as shown in FIG. 24 below) to allow for the variable off-state capacitance, or can be configured in other ways (such as using the capacitance array as shown in FIG. 25 below) that allows for variable capacitance within each switch path.

Figure 22:
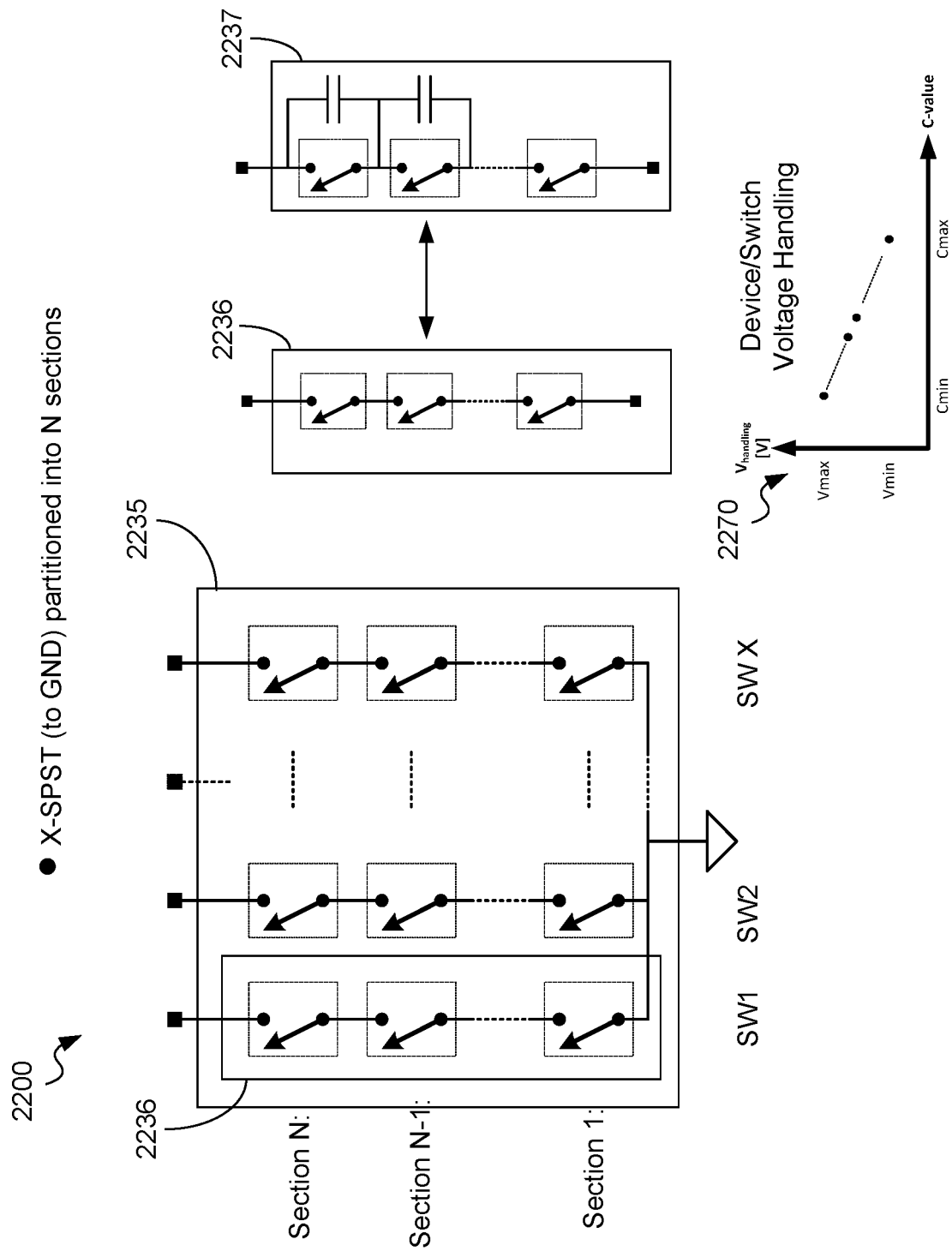
FIG. 22 is a schematic diagram showing exemplary embodiments of the switch logic of FIG. 16, FIG. 17 and FIG. 18.

FIG. 22 is a schematic diagram 2200 showing exemplary embodiments of the switch logic of FIG. 16, FIG. 17 and FIG. 18. In an exemplary embodiment, the switch logic 2235 may be an example of the switch logic 1635 of FIG. 16, the switch logic 1735 of FIG. 17 or the switch logic 1835 of FIG. 18.

In an exemplary embodiment, the switch logic 2235 comprises a plurality of switch paths, SW1 through SW X, with each switch path having multiple sections. For example, an exemplary switch path 2236 comprises N sections, with section 1, section N−1 and section N shown as examples. Each section may relate to a respective FET switch. One or more of the switch paths may also be implemented using a switch path 2237, having one or more capacitances, similar to the switch path 1737 that is described in FIG. 17. The graph 2270 illustrates the tradeoff between the capacitance value shown on the horizontal axis, increasing to the right, and the voltage handling capability shown on the vertical axis, increasing upwardly. As the capacitance provided by each switch path 2236 or 2237 decreases, the voltage handling capability of that switch path increases. Similarly, as the capacitance provided by each switch path 2236 or 2237 increases, the voltage handling capability of that switch path decreases.

Figure 23:
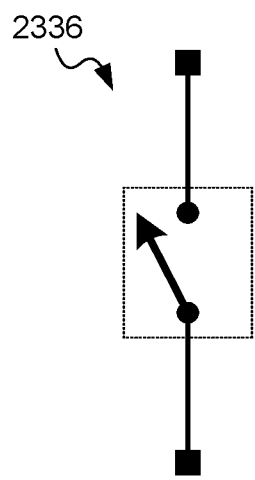
FIG. 23 is a schematic diagram showing exemplary embodiments of a switch in the switch logic of FIG. 16, FIG. 17 and FIG. 18.
Figure 23:
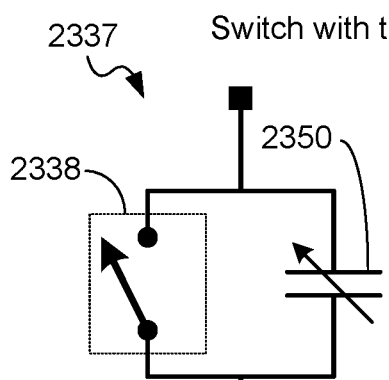
Figure 23:
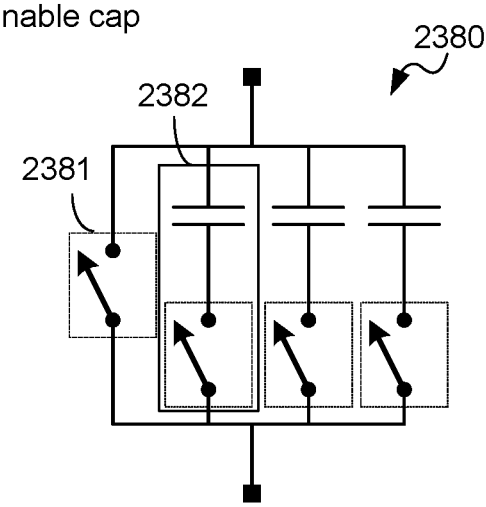
Figure 23:
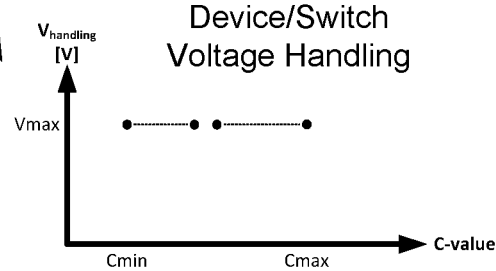

FIG. 23 is a schematic diagram 2300 showing exemplary embodiments of a switch in the switch logic of FIG. 16, FIG. 17 and FIG. 18. In an exemplary embodiment, a switch path 2336 may be implemented using an n-type FET. In an exemplary embodiment, a switch path 2337 may be implemented using an n-type FET 2338 and may include a capacitance 2350 across the FET 2338. In an exemplary embodiment, a switch path 2380 may be implemented with an n-type FET 2381 and an adjustable or switched capacitance 2382 located in parallel across the FET 2381. A plurality of adjustable or switched capacitances 2382 may be located across the FET 2381 to add adjustability to the amount of off-capacitance, Coff, provided by the switch 2380.

The graph 2370 illustrates that for adjustable capacitance located in parallel across a switch, that there is no tradeoff between the capacitance value shown on the horizontal axis, increasing to the right, and the voltage handling capability shown on the vertical axis, increasing upwardly. As the capacitance provided by each switch path 2336, 2337 or 2380 changes, the voltage handling capability of that switch path remains constant.

FIG. 24 is a schematic diagram 2400 showing an example of the switch path of FIG. 22. In an exemplary embodiment, the switch path 2436 may comprise a plurality of FET devices 2442 comprising switch section N, a plurality of FET devices 2444 comprising switch section N−1, and a plurality of FET devices 2446 comprising switch section 1. Each of the FET devices may be implemented as a body diode connected NFET unit cell, as shown using reference numeral 2438. In an exemplary embodiment, each switch section N 2442, switch section N−1 2444, and switch section 1 2446 may be controlled by a separate control signal (e.g., coupled to the gates of the FETs in that section), allowing the switch path 2436 to provide a variable off-capacitance.

FIG. 25 is a schematic diagram 2500 showing an example of the switch path of a plurality of stacked FET devices. The diagram 2500 shows a plurality of stacked NFET devices 2542 and an example of a two (2)-bit stacked NFET binary switched capacitor array 2550. For example, each control input 2562 (of the NFET devices 2542), 2564 and 2566 (of the NFET binary switched capacitor array 2550) may be coupled to a separate control signal.

Figure 26:
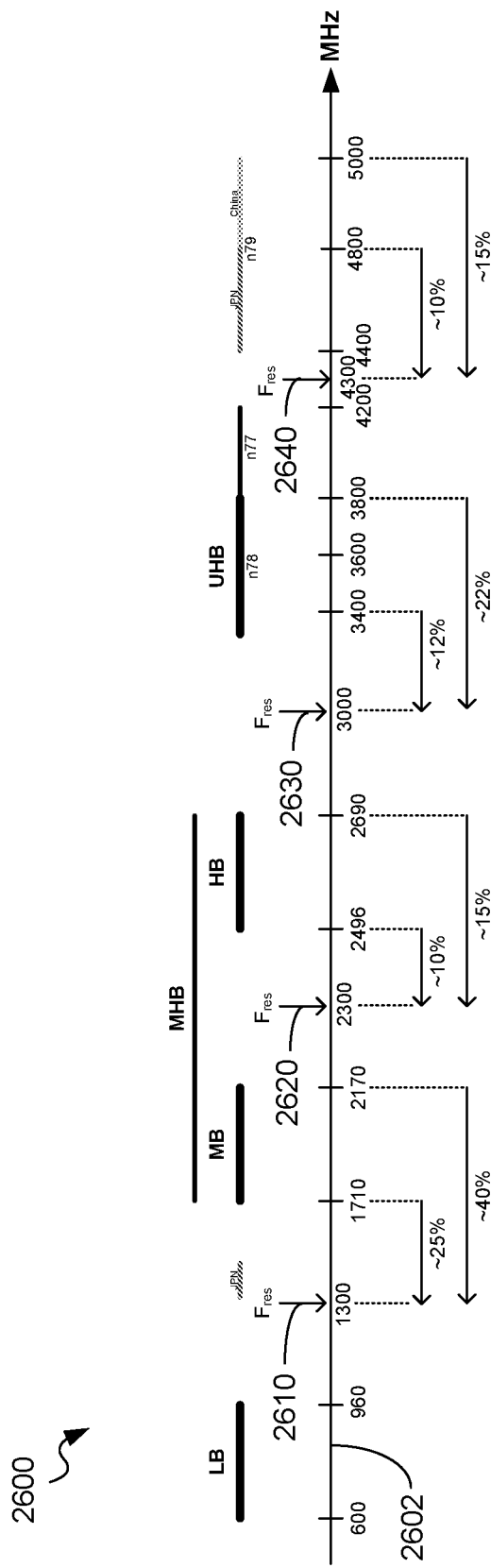
FIG. 26 is a portion of a communication spectrum showing exemplary communication bands and circuit resonances in accordance with an exemplary embodiment of the disclosure.

FIG. 26 is a portion of a communication spectrum 2600 showing exemplary communication bands and circuit resonances in accordance with an exemplary embodiment of the disclosure. The communication spectrum 2600 shows a horizontal axis 2602 showing frequency (in MHz) increasing to the right. The communication spectrum 2600 also shows a number of different frequency bands spanning from approximately 600 MHz to approximately 5000 MHz. The communication spectrum 2600 also shows a circuit resonance 2610 at approximately 1300 MHz, a circuit resonance 2620 at approximately 2300 MHz, a circuit resonance 2630 at approximately 3000 MHz, and a circuit resonance 2640 at approximately 4300 MHz. The location of the circuit resonances 2610, 2620, 2630 and 2640 illustrate how circuit resonances may be moved, or shifted, away from particular frequencies of interest.

For example, the circuit resonance 2610 appearing at approximately 1300 MHz may have initially appeared at approximately 1710 MHz or at approximately 2170 MHz. Shifting the circuit resonance 2610 from 1710 MHz to 1300 MHz represents an approximate 25% frequency shift, and shifting the circuit resonance 2610 from 2170 MHz to 1300 MHz represents an approximate 40% frequency shift.

Similarly, the circuit resonance 2620 appearing at approximately 2300 MHz may have initially appeared at approximately 2496 MHz or at approximately 2690 MHz. Shifting the circuit resonance 2620 from 2496 MHz to 2300 MHz represents an approximate 10% frequency shift, and shifting the circuit resonance 2620 from 2690 MHz to 2300 MHz represents an approximate 15% frequency shift.

Similarly, the circuit resonance 2630 appearing at approximately 3000 MHz may have initially appeared at approximately 3400 MHz or at approximately 3800 MHz. Shifting the circuit resonance 2630 from 3400 MHz to 3000 MHz represents an approximate 12% frequency shift, and shifting the circuit resonance 2630 from 3800 MHz to 3000 MHz represents an approximate 22% frequency shift.

Similarly, the circuit resonance 2640 appearing at approximately 4300 MHz may have initially appeared at approximately 4800 MHz or at approximately 5000 MHz. Shifting the circuit resonance 2640 from 4800 MHz to 4300 MHz represents an approximate 10% frequency shift, and shifting the circuit resonance 2640 from 5000 MHz to 4300 MHz represents an approximate 15% frequency shift. In this manner, the circuit resonances 2610, 2620, 2630 and 2640 may be shifted so as to not detrimentally impact communication on particular desired frequency bands.

Figure 27:
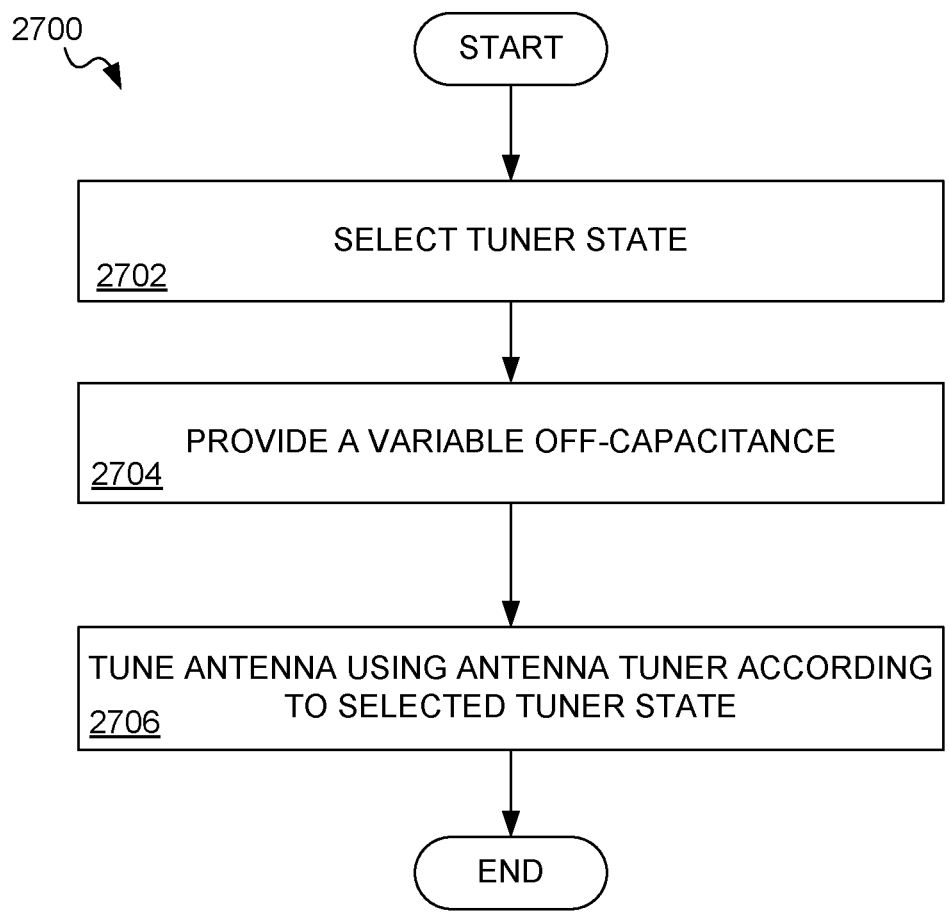
FIG. 27 is a flow chart describing the operation of an exemplary embodiment of an antenna tuner in accordance with various aspects of the disclosure.

FIG. 27 is a flow chart 2700 describing the operation of an exemplary embodiment of an antenna tuner in accordance with various aspects of the disclosure. The blocks in the method 2700 can be performed in or out of the order shown, and in some embodiments, can be performed at least in part in parallel. In an exemplary embodiment, the method 2700 will make reference to some or all of the elements in the antenna tuner 315 and the antenna tuner logic 330 FIG. 3. However, the method 2700 applies to all exemplary embodiments of the antenna tuner described herein.

In block 2702, a tuner state is selected. For example, the antenna tuner logic 330 may select from one of a number of different tuner states using one or more communication bands.

In block 2704, a variable off-capacitance is provided. For example, the switch logic 335 may be configured to provide a variable off-capacitance.

In block 2706, an antenna response may be adjusted based on the selected tuner state. For example, if a tuner state is selected that includes an antenna response that may have a detrimental (circuit or antenna) resonance, the antenna tuner logic may adjust an antenna response by sending a control signal to the antenna tuner 315 to alter the off-capacitance of one or more switches or switch paths in the antenna tuner 315 to shift the detrimental resonance to a portion of the communication spectrum where the response will not detrimentally affect communication on a particular communication band or frequency. In an exemplary embodiment, the method in blocks 2702 and 2704 may be performed in a single step.

Figure 28:
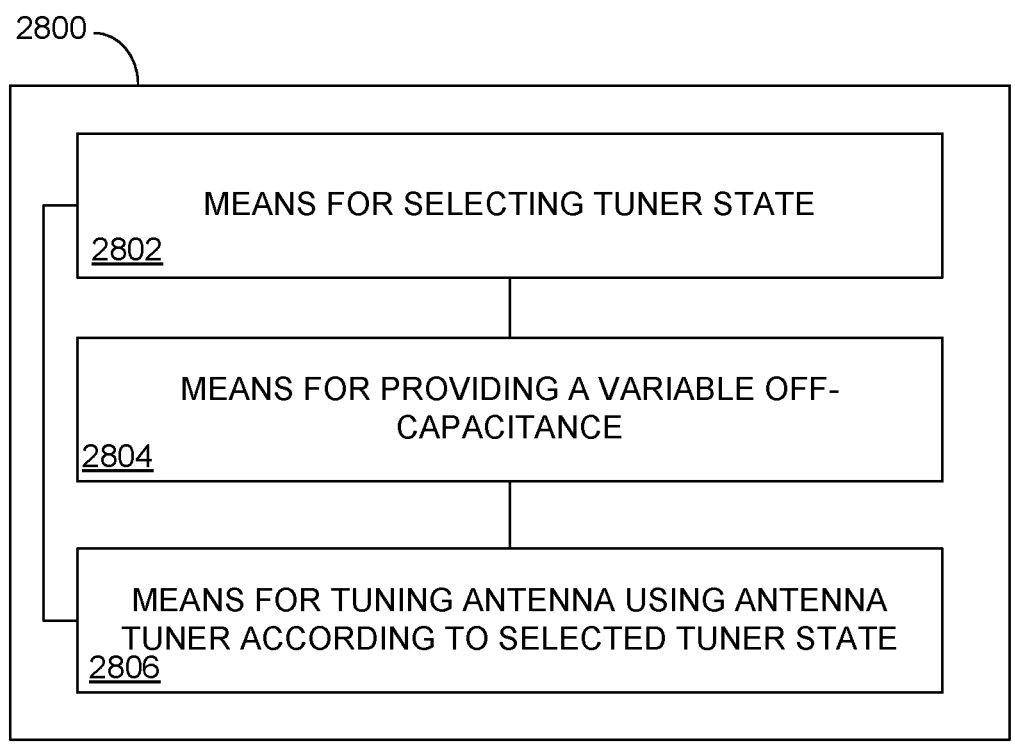
FIG. 28 is a functional block diagram of an apparatus for an antenna tuning system in accordance with an exemplary embodiment of the disclosure.

FIG. 28 is a functional block diagram of an apparatus 2800 for an antenna tuning system in accordance with an exemplary embodiment of the disclosure. The apparatus 2800 comprises means 2802 for selecting a tuner state. In certain embodiments, the means 2802 for selecting a tuner state can be configured to perform one or more of the functions described in operation block 2702 of method 2700 (FIG. 27). In an exemplary embodiment, the means 2802 for selecting a tuner state may comprise the PLL-synthesizer 209 and the antenna tuner logic 330 selecting a tuner state.

The apparatus 2800 also comprises means 2804 for providing a variable off-capacitance. In certain embodiments, the means 2804 for providing a variable off-capacitance can be configured to perform one or more of the functions described in operation block 2704 of method 2700 (FIG. 27). In an exemplary embodiment, the means 2804 for providing a variable off-capacitance may comprise the switch logic 335 being configured to provide a variable off-capacitance.

The apparatus 2800 also comprises means 2806 for adjusting an antenna response based on the selected tuner state. In certain embodiments, the means 2806 for adjusting an antenna response based on the selected tuner state can be configured to perform one or more of the functions described in operation block 2706 of method 2700 (FIG. 27). In an exemplary embodiment, the means 2806 for adjusting an antenna response based on the selected tuner state may comprise the antenna tuner logic 330 and the antenna tuner 315 adjusting an antenna response based on the selected tuner state.

The antenna tuning system described herein may be implemented on one or more ICs, analog ICs, RFICs, mixed-signal ICs, ASICs, printed circuit boards (PCBs), electronic devices, etc. The antenna tuning system described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the antenna tuning system described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC, (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Other such non-transitory computer-readable media may also be implemented. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An antenna tuner, comprising:
    a control core;
    a switch logic coupled to the control core, the switch logic comprising a variable off-capacitance; and
    an electrical coupling coupled to the switch logic, the electrical coupling configured to connect the switch logic to an antenna system;
    wherein the control core is configured to receive a first control signal from an antenna tuner logic, the antenna tuner logic having a frequency/band list, a frequency/band combination logic and a look-up table, the first control signal to configure the variable off-capacitance such that a first resonance appearing at a first initial frequency is shifted to a first adjusted frequency based on a combination of communication bands selected by the frequency/band combination logic.

2. The antenna tuner of claim 1, wherein the switch logic comprises a plurality of variable capacitances, the variable capacitances configured to determine the variable off-capacitance of the switch logic.

3. The antenna tuner of claim 1, wherein the switch logic comprises a plurality of field effect transistor (FET) switches configured as variable capacitances, the variable capacitances configured to determine the variable off-capacitance of the switch logic.

4. The antenna tuner of claim 3, wherein a plurality of field effect transistor (FET) switches provides a range of off-capacitance values based on a combination of communication bands selected by the frequency/band combination logic.

5. The antenna tuner of claim 1, wherein the control core is configured to provide a second control signal to the switch logic to configure the variable off-capacitance such that the first resonance appearing at the first initial frequency is shifted to the first adjusted frequency based on the first control signal.

6. The antenna tuner of claim 5, there being a second resonance appearing at a second initial frequency, wherein the control core is configured to provide a control signal to the switch logic to configure the variable off-capacitance such that the second resonance is shifted to a second adjusted frequency, different than the first adjusted frequency.

7. The antenna tuner of claim 6, wherein the resonance is a circuit resonance of the antenna tuner or an antenna resonance.

8. The antenna tuner of claim 1, wherein the switch logic comprises multiple paths, each path comprising an instance of the variable off-capacitance coupled to a corresponding radio frequency (RF) connection.

9. The antenna tuner of claim 8, further comprising an inductance coupled to each RF connection, where each inductance is also coupled to an antenna aperture port.

10. The antenna tuner of claim 9, wherein a side of the variable off-capacitance opposite the corresponding RF connection is coupled to a system ground.

11. The antenna tuner of claim 9, wherein the antenna aperture port is coupled to a first location along an antenna and an antenna RF feed is coupled to a second location along the antenna, the second location being spaced apart from the first location.

12. An antenna tuning system, comprising:
    an antenna tuner coupled to an antenna, the antenna tuner having a variable off-capacitance, the antenna having an antenna response; and
    an antenna tuner control configured to provide a control signal to the antenna tuner to configure the variable off-capacitance such that a first resonance appearing at a first initial frequency is shifted to a first adjusted frequency based on a combination of communication bands selected for simultaneous use with the antenna, the selected combination of communication bands comprising at least two different selected communication bands and wherein shifting the first resonance to the first adjusted frequency does not negatively affect communication on a second frequency associated with a selected communication band.

13. The antenna tuning system of claim 12, wherein the combination of communication bands comprises at least two communication bands selected from a low-band frequency range, a mid-band frequency range, a high-band frequency range and an ultra-high-band frequency range.

14. The antenna tuning system of claim 12, further comprising a second resonance appearing at a second initial frequency, wherein the second resonance is shifted to a second adjusted frequency, different than the first adjusted frequency.

15. The antenna tuning system of claim 12, wherein the control signal comprises a mobile industry processor interface (MIPI) communication.

16. The antenna tuning system of claim 12, wherein variable off-capacitance is created in the antenna tuner using a field effect transistor (FET) switch.

17. The antenna tuning system of claim 16, wherein a plurality of field effect transistor (FET) switches provides a range of off-capacitance values based on the combination of communication bands selected by the antenna tuner control.

18. The antenna tuning system of claim 12, further comprising a switch logic in the antenna tuner, the switch logic comprising multiple paths, each path comprising an instance of the variable off-capacitance coupled to a corresponding radio frequency (RF) connection.

19. The antenna tuning system of claim 18, further comprising an inductance coupled to each RF connection, where each inductance is also coupled to a system ground.

20. The antenna tuning system of claim 19, wherein a side of the variable off-capacitance opposite the corresponding RF connection is coupled to an antenna aperture port.

21. The antenna tuning system of claim 20, wherein the antenna aperture port is coupled to a first location along an antenna and an antenna RF feed is coupled to a second location along the antenna, the second location being spaced apart from the first location.

22. The antenna tuning system of claim 12, wherein the resonance is a circuit resonance or an antenna resonance.

23. A method for communication, comprising:
selecting a tuner state;
providing a variable off-capacitance; and
tuning an antenna having an antenna response using an antenna tuner including the provided variable off-capacitance to shift a first resonance appearing at a first initial frequency to a first adjusted frequency based on the selected tuner state, for communicating simultaneously on two different communication bands and wherein shifting the first resonance to the first adjusted frequency does not negatively affect simultaneous communication on a second frequency in one of the two different communication bands.

24. The method of claim 23, wherein selecting the tuner state further comprises selecting a combination of communication bands comprising at least two communication bands selected from a low-band frequency range, a mid-band frequency range, a high-band frequency range and an ultra-high-band frequency range.

25. The method of claim 23, further comprising shifting a second resonance appearing at a second initial frequency to a second adjusted frequency, different than the first adjusted frequency.

26. The method of claim 23, further comprising communicating the selected tuner state to the antenna tuner using a mobile industry processor interface (MIPI) communication.

27. A device for communication, comprising:
means for selecting a tuner state;
means for providing a variable off-capacitance; and
means for tuning an antenna having an antenna response using the variable off-capacitance to shift a first resonance appearing at a first initial frequency to a first adjusted frequency based on the selected tuner state, for communicating simultaneously on two different communication bands and wherein shifting the first resonance to the first adjusted frequency does not detrimentally affect simultaneous communication on a second frequency.

28. The device of claim 27, wherein the means for selecting a tuner state further comprises means for selecting a combination of communication bands comprising at least two communication bands selected from a low-band frequency range, a mid-band frequency range, a high-band frequency range and an ultra-high-band frequency range.

29. The device of claim 27, wherein the means for tuning further comprises means for shifting a second resonance appearing at a second initial frequency to a second adjusted frequency, different than the first adjusted frequency.

30. The device of claim 27, further comprising means for communicating the selected tuner state to an antenna tuner using a mobile industry processor interface (MIPI) communication.

* * * * *